(12) United States Patent
Choi

(10) Patent No.: US 11,572,726 B2
(45) Date of Patent: Feb. 7, 2023

(54) VEHICLE DOOR OPENING AND CLOSING APPARATUS

(71) Applicants: Hyundai Motor Company, Seoul (KR); Kia Corporation, Seoul (KR)

(72) Inventor: Je Won Choi, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 95 days.

(21) Appl. No.: 17/306,164

(22) Filed: May 3, 2021

(65) Prior Publication Data

US 2022/0090427 A1 Mar. 24, 2022

(30) Foreign Application Priority Data

Sep. 21, 2020 (KR) .......... 10-2020-0121747

(51) Int. Cl.
| | |
|---|---|
| *E05D 15/00* | (2006.01) |
| *E05D 15/48* | (2006.01) |
| *B60J 5/04* | (2006.01) |
| *E05B 83/40* | (2014.01) |
| *E05B 85/24* | (2014.01) |
| *E05B 85/26* | (2014.01) |

(52) U.S. Cl.
CPC .......... *E05D 15/48* (2013.01); *B60J 5/047* (2013.01); *E05B 83/40* (2013.01); *E05B 85/243* (2013.01); *E05B 85/26* (2013.01); *E05D 2015/485* (2013.01); *E05Y 2201/684* (2013.01); *E05Y 2201/688* (2013.01); *E05Y 2201/716* (2013.01); *E05Y 2201/722* (2013.01); *E05Y 2900/531* (2013.01)

(58) Field of Classification Search
CPC .......... E05D 2015/485; E06B 3/5072
See application file for complete search history.

(56) References Cited

U.S. PATENT DOCUMENTS

| | | | |
|---|---|---|---|
| 8,567,126 B2 * | 10/2013 | Hozumi | B60J 5/06 49/143 |
| 9,637,968 B2 * | 5/2017 | Guitar | E05D 15/581 |
| 10,494,847 B1 * | 12/2019 | Phillip | E05D 15/0686 |
| 2016/0272054 A1 * | 9/2016 | Maruyama | B60J 5/06 |
| 2019/0031000 A1 * | 1/2019 | Houmani | B60J 5/0486 |
| 2021/0140215 A1 | 5/2021 | Choi | |

FOREIGN PATENT DOCUMENTS

KR 20210057616 A 5/2021

* cited by examiner

*Primary Examiner* — Daniel J Troy
*Assistant Examiner* — Daniel Alvarez
(74) *Attorney, Agent, or Firm* — Slater Matsil, LLP

(57) ABSTRACT

A vehicle door opening and closing apparatus includes a vehicle door, a rail mounted on a vehicle body having a door aperture, a roller unit mounted on the vehicle door and configured to move along the rail and to allow the vehicle door to open and close in a sliding mode and in a swing mode, a sliding guide extending from a rear edge of the door aperture and extending straightly in a longitudinal direction of the vehicle body, a swing guide bent from the sliding guide toward an interior of the vehicle body, a center roller unit mounted on the vehicle door and guided along the sliding guide and the swing guide, and a variable stopper mechanism covering an exterior-side opening of the swing guide in the sliding mode and uncovering the exterior-side opening of the swing guide in the swing mode.

20 Claims, 33 Drawing Sheets

VEHICLE DOOR OPENING AND CLOSING APPARATUS

CROSS-REFERENCE TO RELATED APPLICATIONS

This application claims the benefit of Korean Patent Application No. 10-2020-0121747, filed in the Korean Intellectual Property Office on Sep. 21, 2020, which application is hereby incorporated herein by reference.

TECHNICAL FIELD

The present disclosure relates to a vehicle door opening and closing apparatus.

BACKGROUND

Vehicles have door apertures for ingress and egress of passengers to and from a passenger compartment. A vehicle door is closed to block the door aperture and is opened to enable ingress and egress of passengers to and from the passenger compartment through the door aperture. Vehicle doors are divided into swing doors and sliding doors. The swing door is opened and closed by swinging around a hinge mounted between the swing door and the vehicle body. The sliding door is opened and closed by sliding a roller mounted on the sliding door along a rail mounted on the vehicle body.

The swing door is very easy to open and close, thereby enabling quick ingress and egress of passengers. However, when the swing door is opened, a space for ingress and egress is relatively small. When the vehicle is located in a narrow space, a swing trajectory of the door is not secured, which makes the opening and closing operation thereof difficult.

The sliding door is very easy to open and close even when the vehicle is located in a narrow space. When the sliding door is opened, a space for ingress and egress is relatively large. However, the sliding door requires relatively much force and time to open and close, which hinders quick ingress and egress of passengers.

According to the related art, as a vehicle door is operated by a single opening and closing method, it may be difficult to adequately respond to the needs of customers seeking ease of use, diversity, and novelty.

The above information described in this background section is provided to assist in understanding the background of the inventive concept, and may include any technical concept which is not considered as the prior art that is already known to those skilled in the art.

SUMMARY

Embodiments of the present disclosure can solve problems occurring in the prior art while advantages achieved by the prior art are maintained intact.

The present disclosure relates to a vehicle door opening and closing apparatus. Particular embodiments relate to a vehicle door opening and closing apparatus allowing a vehicle door to open and close in one mode selected from a sliding mode and a swing mode, and more particularly, to a vehicle door opening and closing apparatus capable of preventing a center roller unit from being separated from a center rail in a sliding mode and allowing the center roller unit to be released from the center rail in a swing mode.

An embodiment of the present disclosure provides a vehicle door opening and closing apparatus allowing a vehicle door to open and close in one mode selected from a swing mode and a sliding mode, thereby satisfying the needs of customers, and capable of preventing a center roller unit from being separated from a center rail in the sliding mode and allowing the center roller unit to be released from the center rail in the swing mode.

According to an embodiment of the present disclosure, a vehicle door opening and closing apparatus may include a vehicle door, a rail mounted on a vehicle body, a roller unit mounted on the vehicle door, moving along the rail, and allowing the vehicle door to open and close in one mode selected from a sliding mode and a swing mode, a sliding guide extending from a rear edge of a door aperture of the vehicle body and extending straightly in a longitudinal direction of the vehicle, a swing guide bent from the sliding guide toward the interior of the vehicle, a center roller unit mounted on the vehicle door, and guided along the sliding guide and the swing guide, and a variable stopper mechanism covering an exterior-side opening of the swing guide in the sliding mode, and uncovering the exterior-side opening of the swing guide in the swing mode.

The variable stopper mechanism may include a first variable stopper moving along the swing guide, a second variable stopper moving along the first variable stopper, and a power transmission mechanism transmitting a force to the first variable stopper and the second variable stopper.

The first variable stopper may include a touch wall with which rollers of the center roller unit come into contact.

As the first variable stopper moves, the second variable stopper may move with the first variable stopper in the same direction through the power transmission mechanism.

The first variable stopper may have a first outboard sidewall and a first exterior-side opening which is aligned with the exterior-side opening of the swing guide, and the second variable stopper may have a second outboard sidewall and a second exterior-side opening which is aligned with the exterior-side opening of the swing guide and the first exterior-side opening.

The first variable stopper and the second variable stopper may move between a covering position in which the second outboard sidewall covers the exterior-side opening of the swing guide and an uncovering position in which the second outboard sidewall uncovers the exterior-side opening of the swing guide.

The first variable stopper and the second variable stopper may be biased to the uncovering position by a biasing element.

The variable stopper mechanism may include a locking lever which locks the second variable stopper so that the second outboard sidewall of the second variable stopper may be kept in the covering position.

A length of the second variable stopper may be less than that of the first variable stopper.

A length of the first exterior-side opening may be less than that of the exterior-side opening of the swing guide, and a length of the second exterior-side opening may be less than that of the first exterior-side opening.

The first variable stopper may have a first rack, and the second variable stopper may have a second rack. The power transmission mechanism may include a first gear meshing with the first rack and a second gear meshing with the second rack, and the first gear and the second gear may form a unitary one-piece structure.

A diameter of the first gear may be greater than that of the second gear.

A length of the second rack may be less than that of the first rack.

A gear ratio of the second gear and the first gear may be defined as a speed increasing ratio.

The first variable stopper and the second variable stopper may be curved to correspond to the sliding guide and the swing guide.

The sliding guide and the swing guide may form a center rail.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
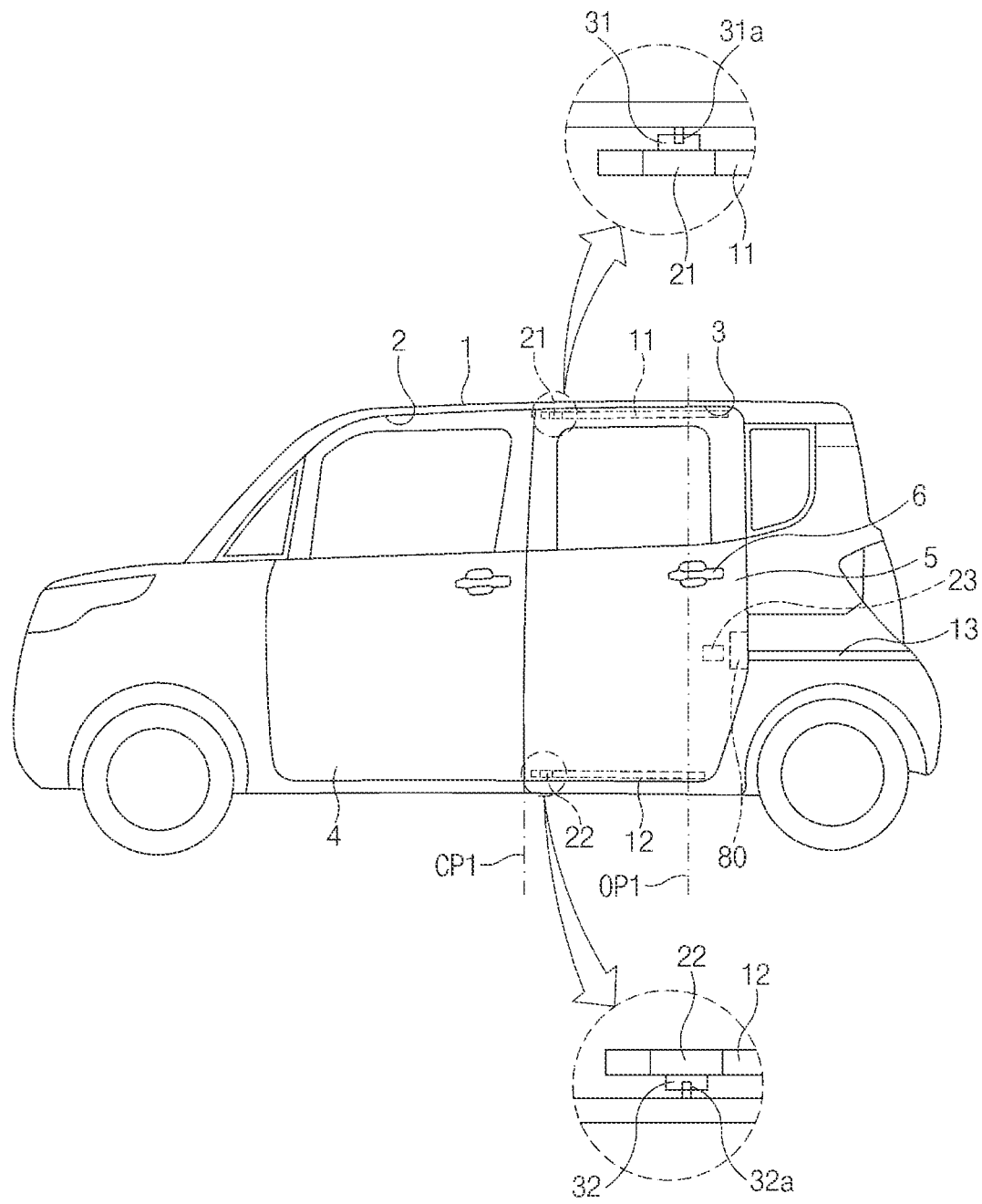
FIG. 1 illustrates a vehicle door opening and closing apparatus according to an exemplary embodiment of the present disclosure, which is mounted on a rear door of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle door opening and closing apparatus, according to exemplary embodiments of the present disclosure, may allow a vehicle door to open and close selectively in any one mode of a sliding mode and a swing mode. In other words, the vehicle door opening and closing apparatus, according to exemplary embodiments of the present disclosure, may be a transform-type door opening and closing apparatus. The sliding mode may allow the vehicle door to open and close by sliding in a longitudinal direction of a vehicle, and the swing mode may allow the vehicle door to open and close by swinging inwards and outwards.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

The vehicle door opening and closing apparatus, according to exemplary embodiments of the present disclosure, may be applied to the front door 4, the rear door 5, and the like. FIGS. 1 to 4 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3.

The vehicle door opening and closing apparatus, according to exemplary embodiments of the present disclosure, may include one or more rails 11 and 12 mounted on the vehicle body 1, and the rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus, according to exemplary embodiments of the present disclosure, may include roller units 21 and 22 guided along the rails 11 and 12. The roller units 21 and 22 may allow the vehicle door 5 to open and close in one mode selected from the sliding mode and the swing mode. In particular, the roller units 21 and 22 may be releasably held in predetermined positions of the rails 11 and 12 by hold locks 31 and 32. Specifically, when the roller units 21 and 22 are held in the predetermined positions of the rails 11 and 12 by the hold locks 31 and 32, the vehicle door 5 may be opened and closed in the swing mode in which the vehicle door swings in the predetermined positions of the rails 11 and 12. When the roller units 21 and 22 are released by the hold locks 31 and 32, the vehicle door 5 may be opened and closed in the sliding mode in which the vehicle door slides along the rails 11 and 12.

Figure 3:
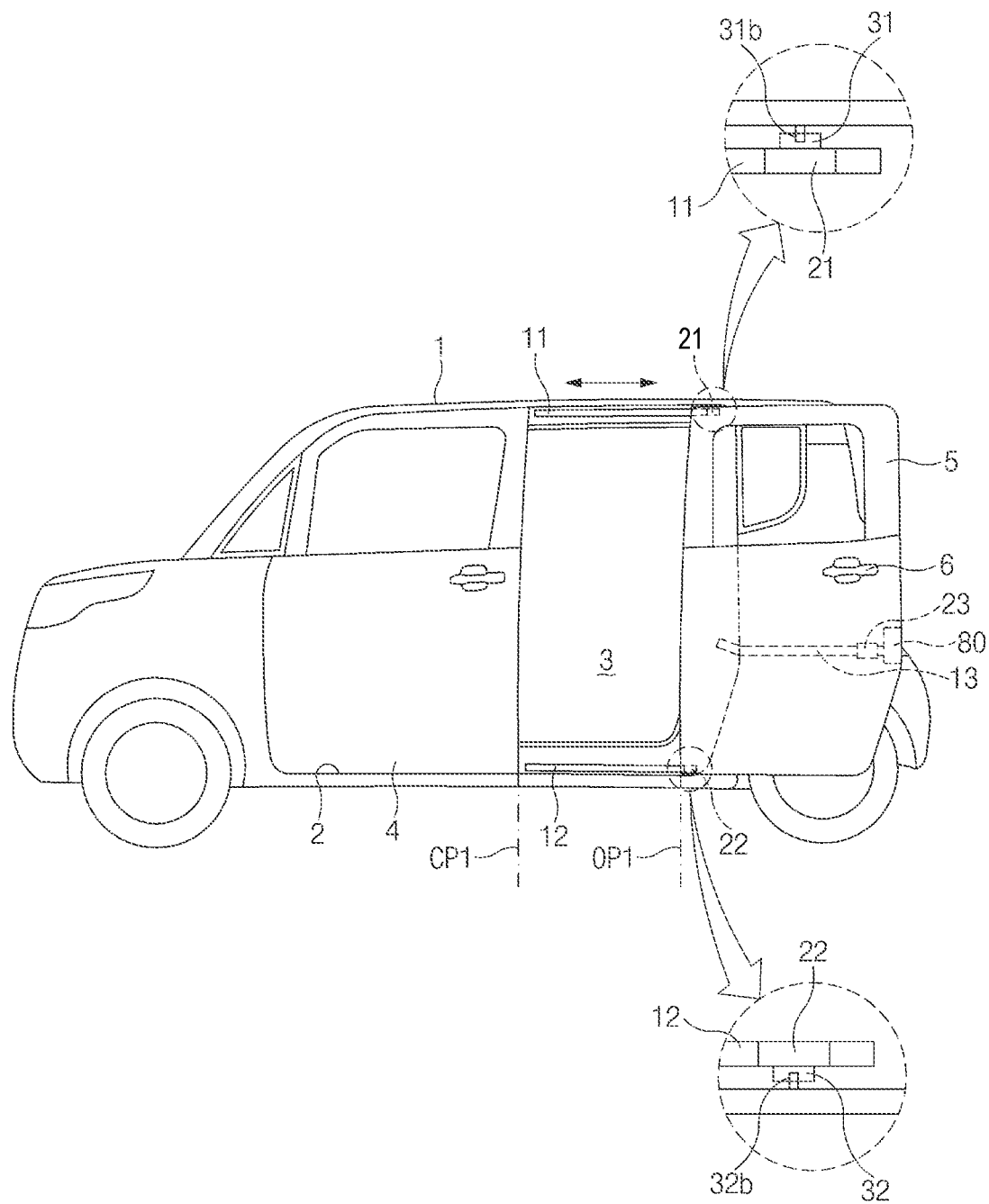
FIG. 3 illustrates a state in which the door of FIG. 1 is opened in a sliding mode.

Referring to FIGS. 1 and 3, an upper roller unit 21 may be mounted on an upper end of the vehicle door 5, and the upper roller unit 21 may slide along the upper rail 11. A lower roller unit 22 may be mounted on a lower end of the vehicle door 5, and the lower roller unit 22 may slide along the lower rail 12.

Figure 2:
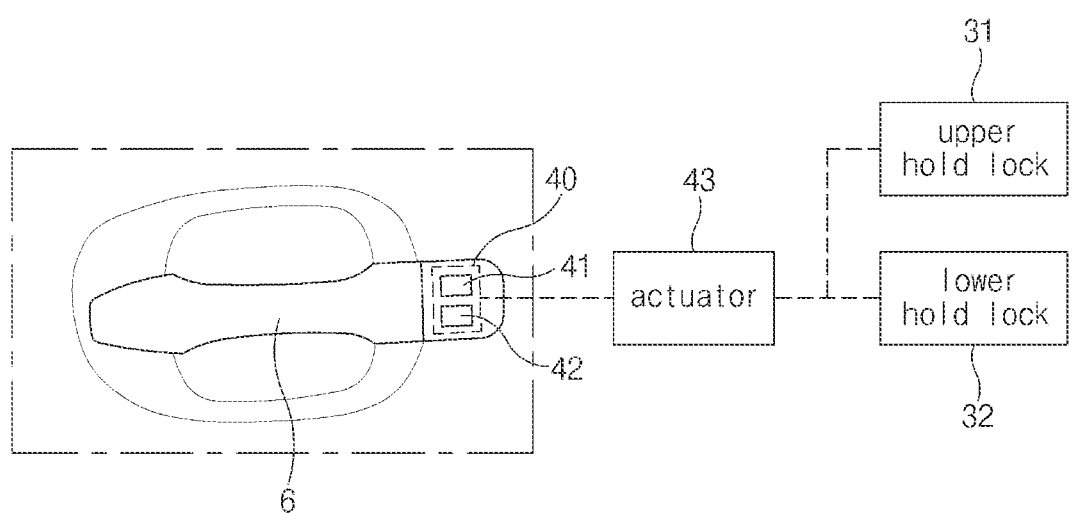
FIG. 2 illustrates a selector adjacent to an outside handle of a vehicle, an actuator connected to the selector, and hold locks.

Referring to FIG. 2, the vehicle door 5 may include an outside handle 6, and a selector 40 for selecting the sliding mode and the swing mode may be disposed on the outside handle 6 or the vehicle door adjacent to the outside handle 6. The selector 40 may have a first switch 41 selecting the sliding mode, and a second switch 42 selecting the swing mode.

When a user presses the first switch 41 and the sliding mode is selected, the vehicle door 5 may slide along the upper rail 11, the lower rail 12, and a center rail 13 as illustrated in FIG. 3 as the user pushes the outside handle 6 toward the front of the vehicle or pulls the outside handle 6 toward the rear of the vehicle. In the sliding mode, the vehicle door 5 may move between a first open position OP1 in which the vehicle door 5 is fully opened and a first closed position CP1 in which the vehicle door 5 is fully closed, as illustrated in FIGS. 1 and 3.

Figure 4:
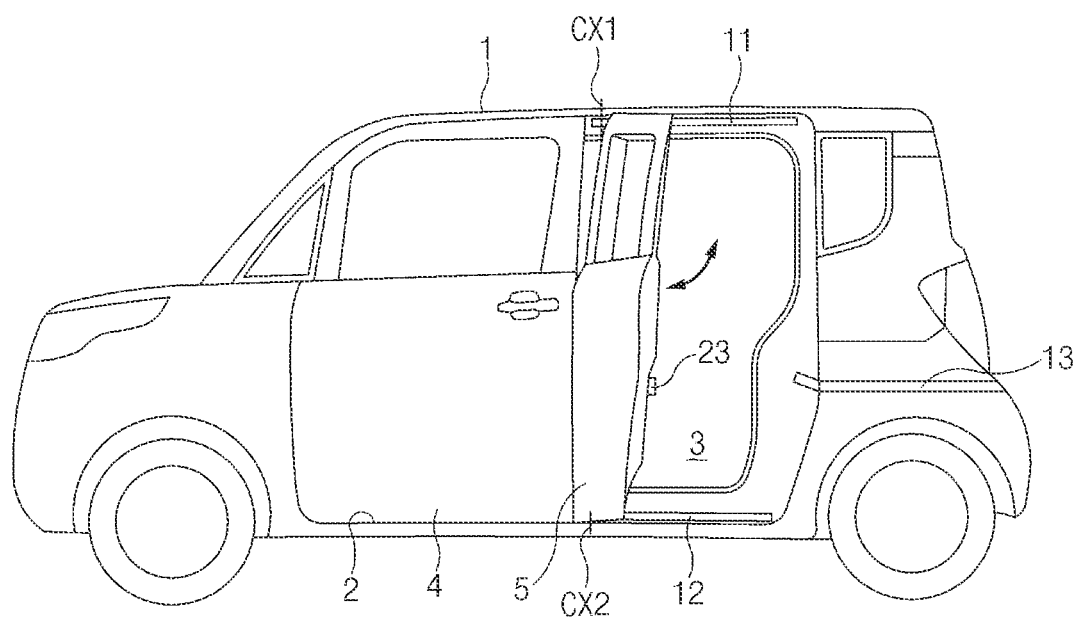
FIG. 4 illustrates a state in which the door of FIG. 1 is opened in a swing mode.
Figure 6:
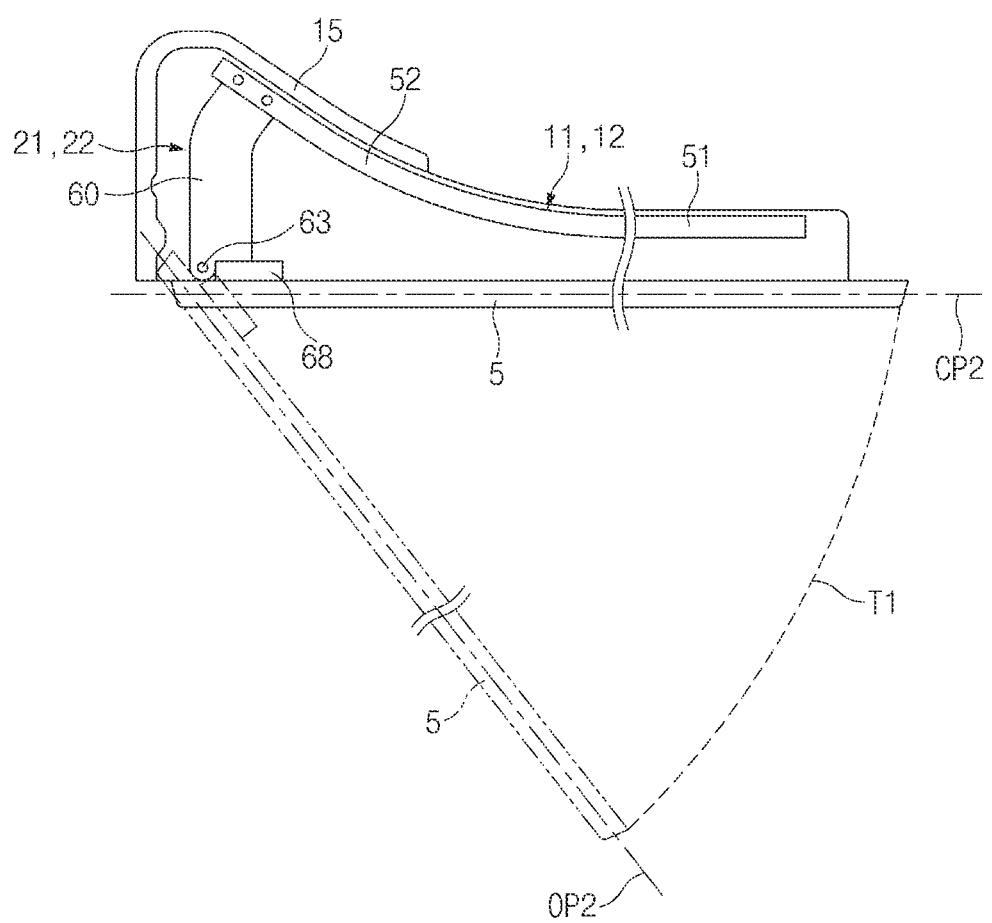
FIG. 6 illustrates a state in which a vehicle door pivots by an upper roller unit and a lower roller unit when the vehicle door is opened and closed in a swing mode in a vehicle door opening and closing apparatus according to an exemplary embodiment of the present disclosure.

When the user presses the second switch 42 and the swing mode is selected, the vehicle door 5 may swing as illustrated in FIG. 4 as the user pushes or pulls the outside handle 6 toward a passenger compartment of the vehicle or toward the exterior side of the vehicle. In the swing mode, the vehicle door 5 may move between a second open position OP2 in which the vehicle door 5 is fully opened and a second closed position CP2 in which the vehicle door 5 is fully closed, as illustrated in FIG. 6. In particular, when the vehicle door 5 is held in the first closed position CP1, it may be operated in the swing mode.

The upper roller unit 21 may have an upper hold lock 31, and the vehicle body 1 may have a first upper striker 31a and a second upper striker 31b protruding downwardly from the top of the vehicle body 1. The first upper striker 31a may be aligned with or adjacent to a virtual axis of the first closed position CP1, and the second upper striker 31b may be aligned with or adjacent to a virtual axis of the first open position OP1.

According to an exemplary embodiment, as illustrated in FIGS. 1 and 3, the upper hold lock 31 may releasably hold the first upper striker 31a in the first closed position CP1, and releasably hold the second upper striker 31b in the first open position OP1. That is, one upper hold lock 31 may selectively hold the first upper striker 31a and the second upper striker 31b. As the upper hold lock 31 holds the first upper striker 31a, the upper roller unit 21 may be firmly held in the first closed position CP1, so that the vehicle door 5 may be kept in the first closed position CP1. As the upper hold lock 31 holds the second upper striker 31b, the upper roller unit 21 may be firmly held in the first open position OP1, so that the vehicle door 5 may be kept in the first open position OP1.

According to another exemplary embodiment, the upper hold lock 31 may releasably hold the first upper striker 31a in the first closed position CP1 so that the vehicle door 5 may be kept in the first closed position CP1. That is, the upper hold lock 31 may be an upper closed hold lock which keeps the closed state of the vehicle door 5 in the first closed position CP1. An upper open hold lock (not shown) may be mounted on the upper roller unit 21, and may releasably hold the second upper striker 31b in the first open position OP1. That is, the upper closed hold lock, which releasably holds the first upper striker 31a in the first closed position CP1, and the upper open hold lock, which releasably holds the second upper striker 31b in the first open position OP1, may be individually mounted on the upper roller unit 21.

Referring to FIG. 4, the upper roller unit 21 may have an upper rotation axis CX1, and the vehicle door 5 may rotate around the upper rotation axis CX1. When the upper roller unit 21 is firmly held in the first closed position CP1 by the upper hold lock 31 and the first upper striker 31a, the vehicle door 5 may rotate around the upper rotation axis CX1.

The lower roller unit 22 may have a lower hold lock 32, and the vehicle body 1 may have a first lower striker 32a and a second lower striker 32b protruding upwardly from the bottom of the vehicle body 1. The first lower striker 32a may be aligned with or adjacent to the virtual axis of the first closed position CP1, and the second lower striker 32b may be aligned with or adjacent to the virtual axis of the first open position OP1.

According to an exemplary embodiment, as illustrated in FIGS. 1 and 3, the lower hold lock 32 may releasably hold the first lower striker 32a in the first closed position CP1, and releasably hold the second lower striker 32b in the first open position OP1. That is, one lower hold lock 32 may selectively hold the first lower striker 32a and the second lower striker 32b. As the lower hold lock 32 holds the first lower striker 32a, the lower roller unit 22 may be firmly held in the first closed position CP1, so that the vehicle door 5 may be kept in the first closed position CP1. As the lower hold lock 32 holds the second lower striker 32b, the lower roller unit 22 may be firmly held in the first open position OP1, so that the vehicle door 5 may be kept in the first open position OP1.

According to another exemplary embodiment, the lower hold lock 32 may releasably hold the first lower striker 32a in the first closed position CP1 so that the vehicle door 5 may be kept in the first closed position CP1. That is, the lower hold lock 32 may be a lower closed hold lock which keeps the closed state of the vehicle door 5 in the first closed position CP1. A lower open hold lock (not shown) may be mounted on the lower roller unit 22, and may releasably hold the second lower striker 32b in the first open position OP1. That is, the lower closed hold lock, which releasably holds the first lower striker 32a in the first closed position CP1, and the lower open hold lock, which releasably holds the second lower striker 32b in the first open position OP1, may be individually mounted on the lower roller unit 22.

According to an exemplary embodiment, the vehicle door 5 may be releasably held in the first closed position CP1 by the upper hold lock 31 and the lower hold lock 32, so that the vehicle door 5 may be kept in the first closed position CP1 by the upper hold lock 31 and the lower hold lock 32. That is, the upper hold lock 31 and the lower hold lock 32 may function as the closed hold lock which holds the vehicle door 5 in the first closed position CP1.

Referring to FIG. 4, the lower roller unit 22 may have a lower rotation axis CX2, and the vehicle door 5 may rotate around the lower rotation axis CX2. When the lower roller unit 22 is firmly held in the first closed position CP1 by the lower hold lock 32 and the first lower striker 32a, the vehicle door 5 may rotate around the lower rotation axis CX2.

As illustrated in FIG. 4, the upper rotation axis CX1 and the lower rotation axis CX2 may be vertically aligned, and the vehicle door 5 may rotate around the vertically aligned upper and lower rotation axes CX1 and CX2.

Referring to FIG. 2, the selector 40 may be electrically connected to an actuator 43, and the actuator 43 may be configured to operate the upper hold lock 31 and the lower hold lock 32.

As the user selects the selector 40, the actuator 43 may selectively perform a hold operation in which the upper hold lock 31 holds the first upper striker 31a and the lower hold lock 32 holds the first lower striker 32a, and a release operation in which the upper hold lock 31 releases the first upper striker 31a and the lower hold lock 32 releases the first lower striker 32a.

When the user presses the first switch 41 of the selector 40 in a state in which the vehicle door 5 is closed, the upper hold lock 31 may release the first upper striker 31a and the lower hold lock 32 may release the first lower striker 32a simultaneously by the release operation of the actuator 43. Thus, the user may slide the vehicle door 5 in the longitudinal direction of the vehicle body 1 so that the vehicle door 5 may be opened and closed in the sliding mode.

When the user presses the second switch 42 of the selector 40 in a state in which the vehicle door 5 is closed, the upper hold lock 31 may hold the first upper striker 31a and the lower hold lock 32 may hold the first lower striker 32a simultaneously by the hold operation of the actuator 43, and the upper roller unit 21 and the lower roller unit 22 may be firmly held in the first closed position CP1. Thus, the user may swing the vehicle door 5 toward an interior space and an exterior space of the vehicle so that the vehicle door 5 may be opened and closed in the swing mode.

According to an exemplary embodiment, as illustrated in FIG. 2, one actuator 43 may operate the upper hold lock 31 and the lower hold lock 32 simultaneously.

According to another exemplary embodiment, an actuator operating the upper hold lock 31 and another actuator operating the lower hold lock 32 may be individually connected to the selector 40.

FIGS. 9A to 9D illustrate the upper hold lock 31 and the lower hold lock 32 according to an exemplary embodiment of the present disclosure. Referring to FIGS. 9A to 9D, each of the upper hold lock 31 and the lower hold lock 32 may include a catch 71, a pawl 72 releasably engaging with the catch 71, and a lever 73 operatively connected to the pawl 72. The lever 73 may be connected to the actuator 43 through a cable 75. As the cable 75 is reversed (pulled) by the actuator 43, the catch 71 may release the strikers 31a and 32a. A portion of the catch 71, the pawl 72, and the lever 73 may be covered by a cover plate 76, and the cover plate 76 may be attached to a mounting plate 74. The strikers 31a and 32a may be fixed to the vehicle body 1 by a mounting plate 78.

Referring to FIGS. 9A to 9D, the upper hold lock 31 may releasably hold the first upper striker 31a, and the lower hold lock 32 may releasably hold the first lower striker 32a.

Figure 9A:
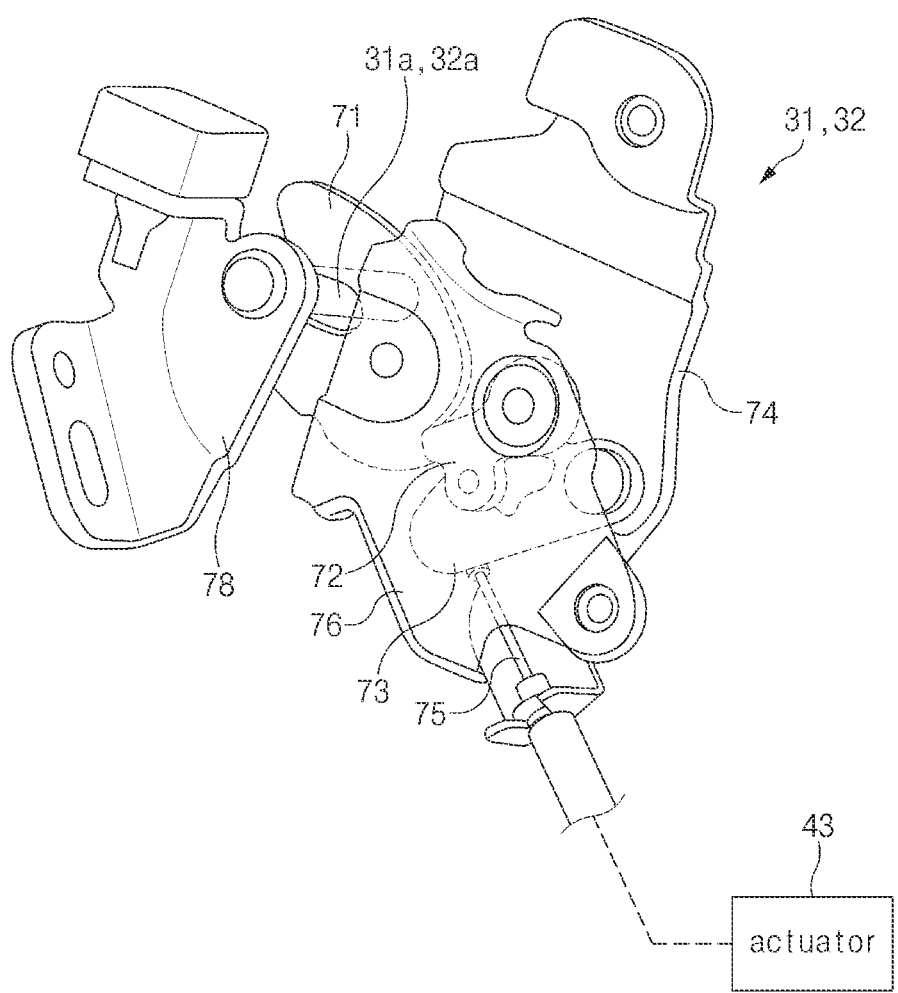
FIG. 9A illustrates a perspective view of an upper hold lock and a lower hold lock.
Figure 9B:
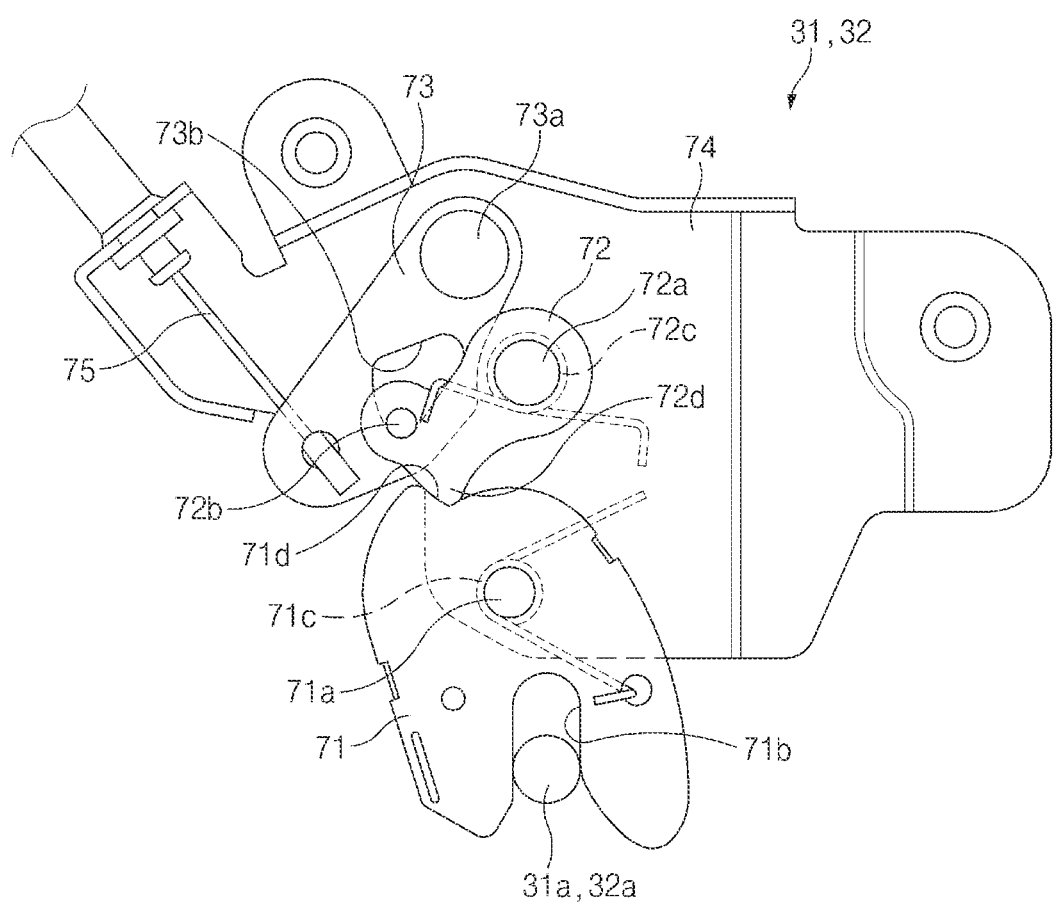
FIG. 9B illustrates a state in which an upper hold lock and a lower hold lock hold corresponding strikers.
Figure 9C:
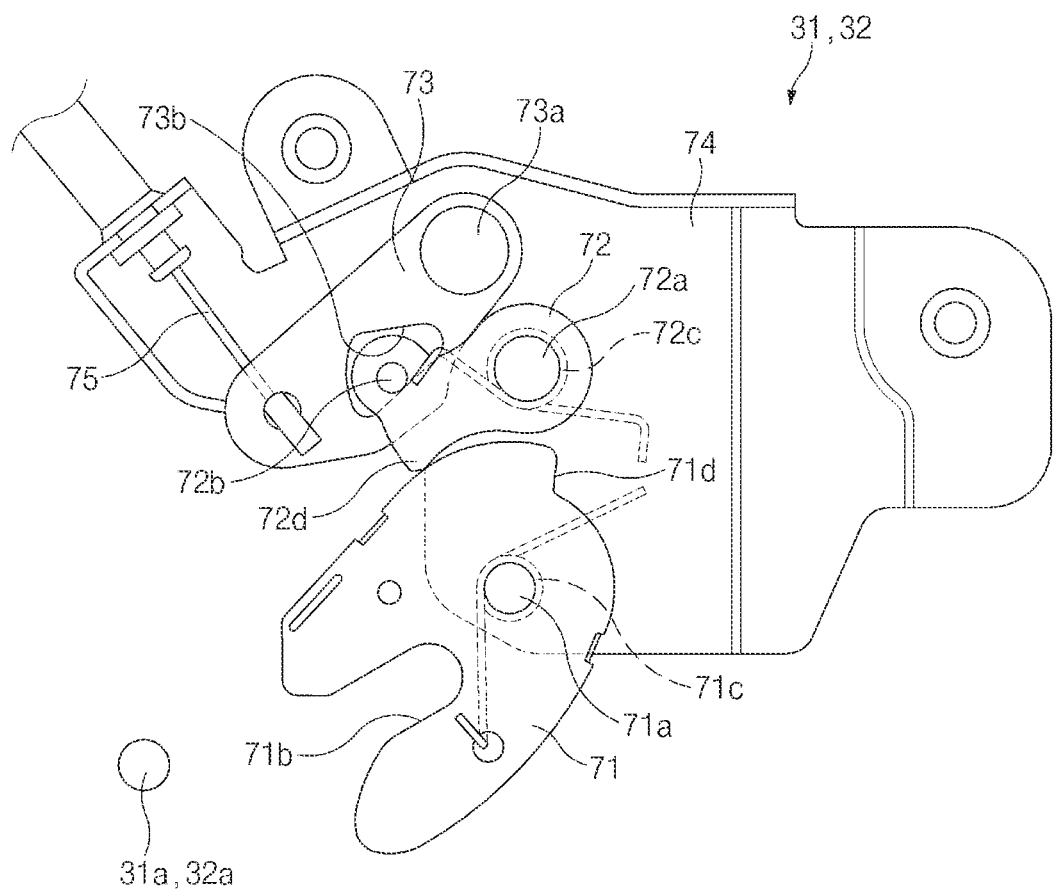
FIG. 9C illustrates a state in which an upper hold lock and a lower hold lock release corresponding strikers.

The catch 71 may be pivotally mounted on the mounting plate 74 through a first pivot shaft 71a. The catch 71 may have a slot 71b receiving the strikers 31a and 32a, and the catch 71 may engage with or release the strikers 31a and 32a. The catch 71 may move between an engaging position (see FIG. 9B) and a release position (see FIG. 9C). The engaging position refers to a position in which the catch 71 engages with the strikers 31a and 32a as illustrated in FIG. 9B, and the release position refers to a position in which the catch 71 releases the strikers 31a and 32a as illustrated in FIG. 9C. When the catch 71 is in the engaging position as illustrated in FIG. 9B, the catch 71 may engage with the strikers 31a and 32a so that the catch 71 may hold the strikers 31a and 32a. When the catch 71 is in the release position as illustrated in FIG. 9C, the catch 71 may release the strikers 31a and 32a. Thus, the strikers 31a and 32a may be released from the slot 71b of the catch 71 or be received in the slot 71b of the catch 71. The catch 71 may be biased toward the release position by a first biasing element 71c such as a torsion spring. The first biasing element 71c may be disposed around the first pivot shaft 71a. The catch 71 may have a locking shoulder 71d.

Figure 9D:
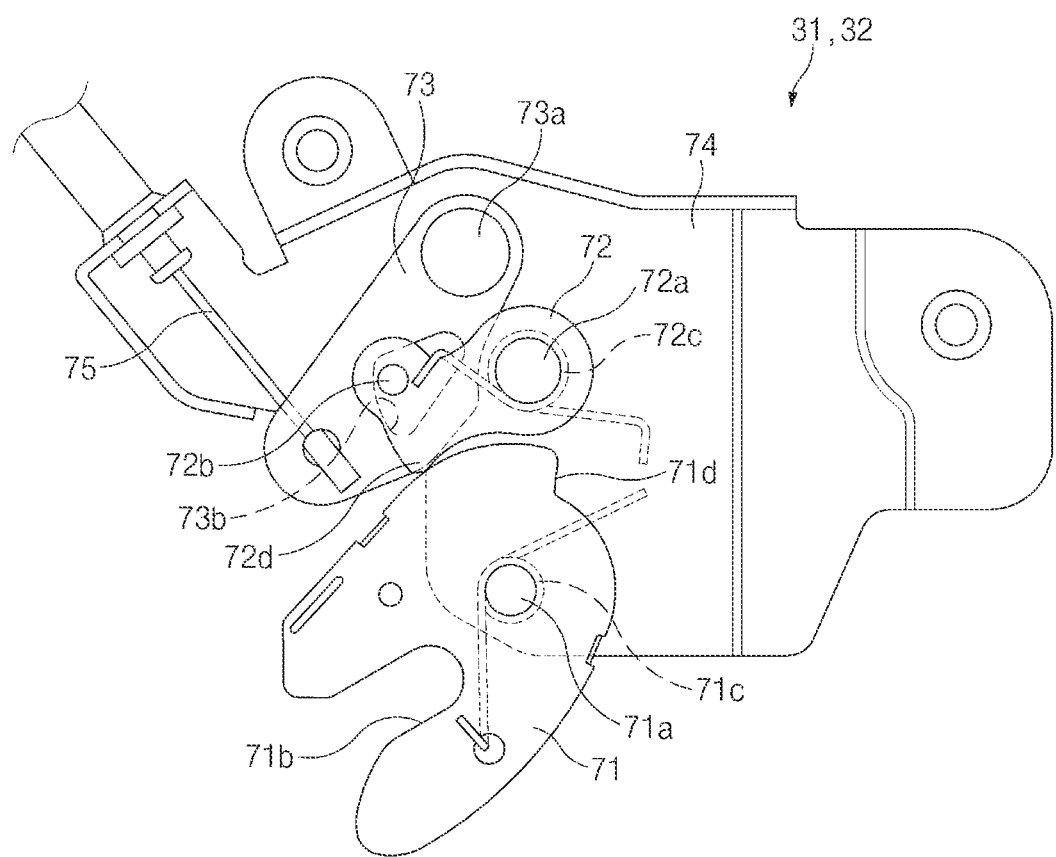
FIG. 9D illustrates a state in which an upper hold lock and a lower hold lock are allowed to receive corresponding strikers.

The pawl 72 may be pivotally mounted on the mounting plate 74 through a second pivot shaft 72a, and the pawl 72 may move between a pawl locking position (see FIG. 9B) and a pawl release position (see FIGS. 9C and 9D). The pawl locking position refers to a position in which the pawl 72 engages with the catch 71 and the catch 71 is kept in the engaging position, and the pawl release position refers to a position in which the pawl 72 releases the catch 71 and the catch 71 is allowed to move from the engaging position to the release position. As illustrated in FIG. 9B, when the pawl 72 is in the pawl locking position, the movement (rotation) of the catch 71 may be restricted by the pawl 72 so that the catch 71 may be kept in the engaging position. As illustrated in FIGS. 9C and 9D, when the pawl 72 is in the pawl release position, the movement (rotation) of the catch 71 may not be restricted by the pawl 72 so that the catch 71 may move from the engaging position to the release position. The pawl 72 may be biased toward the pawl locking position (see FIG. 9B) by a second biasing element 72c such as a torsion spring. The second biasing element 72c may be disposed around the second pivot shaft 72a.

The pawl 72 may have a locking projection 72d locked to the locking shoulder 71d of the catch 71. As illustrated in FIG. 9B, as the pawl 72 is moved to the pawl locking position by the second biasing element 72c, the locking projection 72d of the pawl 72 may be locked to the locking shoulder 71d of the catch 71 and the movement (rotation) of the catch 71 may be restricted, so that the catch 71 may be kept in the engaging position. As illustrated in FIG. 9C, as the pawl 72 is moved to the pawl release position by the lever 73, the locking projection 72d of the pawl 72 may be released from the locking shoulder 71d of the catch 71 and the movement (rotation) of the catch 71 may be allowed, so that the catch 71 may be moved to the release position by the first biasing element 71c.

The lever 73 may be pivotally mounted on the mounting plate 74 through a third pivot shaft 73a. The lever 73 may be connected to the actuator 43 through the cable 75. An end of the cable 75 may be fixed to the lever 73, and the cable 75 may be advanced or reversed by the actuator 43. As the actuator 43 moves the cable 75, the lever 73 may pivot around the third pivot shaft 73a. As the cable 75 is reversed, the lever 73 may move the pawl 72 to the pawl release position (see FIG. 9C).

The lever 73 may be operatively connected to the pawl 72 through a pin 72b and an opening 73b. The pin 72b may be provided on the pawl 72, and the opening 73b may be provided in the lever 73. The pin 72b may be movably received in the opening 73b. As the lever 73 pivots around the third pivot shaft 73a, the pin 72b may move in the opening 73b, allowing the pawl 72 to move.

As illustrated in FIG. 9B, when the cable 75 is advanced by the actuator 43, the locking projection 72d of the pawl 72 may be locked to the locking shoulder 71d of the catch 71 and the movement (rotation) of the catch 71 may be restricted so that the catch 71 may be kept in the engaging position. The strikers 31a and 32a may be held in the slot 71b of the catch 71. That is, the upper hold lock 31 and the lower hold lock 32 may hold the corresponding strikers 31a and 32a.

As illustrated in FIG. 9C, when the cable 75 is reversed by the actuator 43, the lever 73 may move the pawl 72 to the pawl release position. The locking projection 72d of the pawl 72 may be released from the locking shoulder 71d of the catch 71 and the movement (rotation) of the catch 71 may be allowed, so that the catch 71 may be moved to the release position by the first biasing element 71c, and the strikers 31a and 32a may be released from the slot 71b of the catch 71. Thus, the upper hold lock 31 and the lower hold lock 32 may release the corresponding strikers 31a and 32a, and the upper roller unit 21 and the lower roller unit 22 may slide along the upper rail 11 and the lower rail 12.

As illustrated in FIG. 9D, even though the cable 75 is advanced by the actuator 43 in a state in which the locking projection 72d of the pawl 72 is released from the locking shoulder 71d of the catch 71, the catch 71 may be kept in the release position by the first biasing element 71c so that the movement (rotation) of the catch 71 may be allowed. In this state, the strikers 31a and 32a may be allowed to be received in the slot 71b of the catch 71. That is, in a state in which the movement (rotation) of the catch 71 is allowed as the locking projection 72d of the pawl 72 is released from the locking shoulder 71d of the catch 71, when the upper roller unit 21 and the lower roller unit 22 slide between the first closed position CP1 and the first open position OP1, the strikers 31a and 32a may be allowed to be received in the slot 71b of the catch 71. When a force applied by the upper hold lock 31 and the lower hold lock 32 in a state in which the strikers 31a and 32a are received in the slot 71b of the catch 71 is greater than a spring force of the first biasing element 71c, the catch 71 may be moved to the engaging position. As illustrated in FIG. 9B, as the locking projection 72d of the pawl 72 is locked to the locking shoulder 71d of the catch 71, the catch 71 may hold the strikers 31a and 32a.

Figure 5:
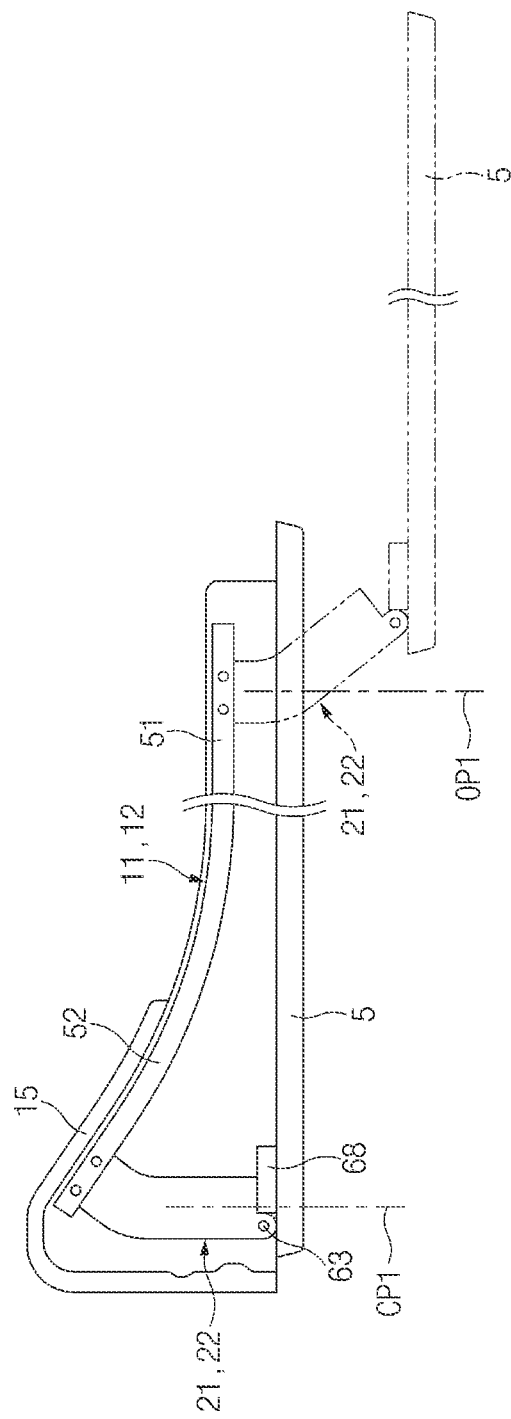
FIG. 5 illustrates a state in which an upper roller unit and a lower roller unit move along an upper rail and a lower rail when a vehicle door is opened and closed in a sliding mode in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending straightly in the longitudinal direction of the vehicle, and a second extension portion 52 extending from the first extension portion 51 toward the interior space of the vehicle. The second extension portion 52 may be bent with respect to the first extension portion 51 at a predetermined angle.

Figure 7:
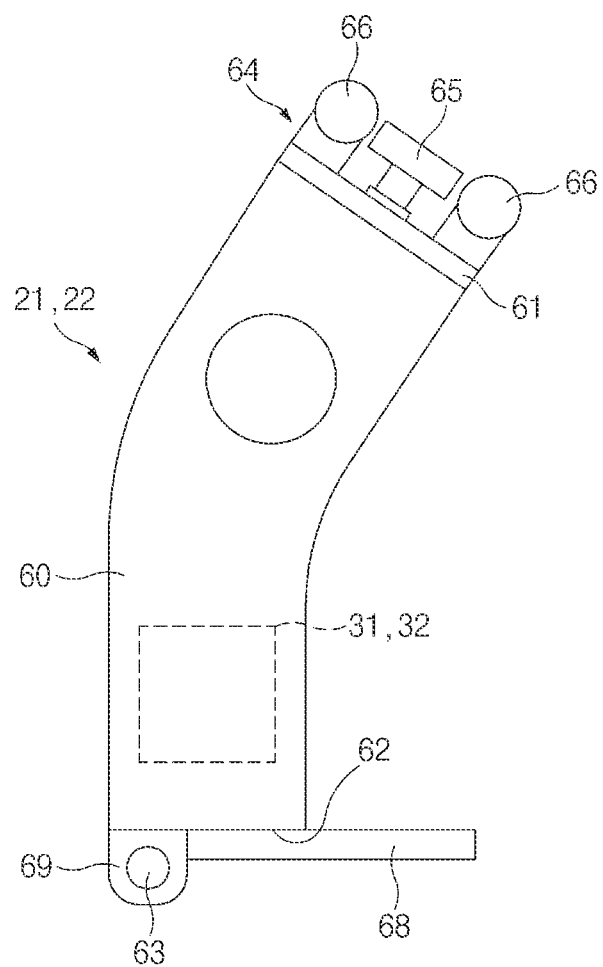
FIG. 7 illustrates an upper roller unit and a lower roller unit in a vehicle door opening and closing apparatus according to an exemplary embodiment of the present disclosure.
Figure 8:
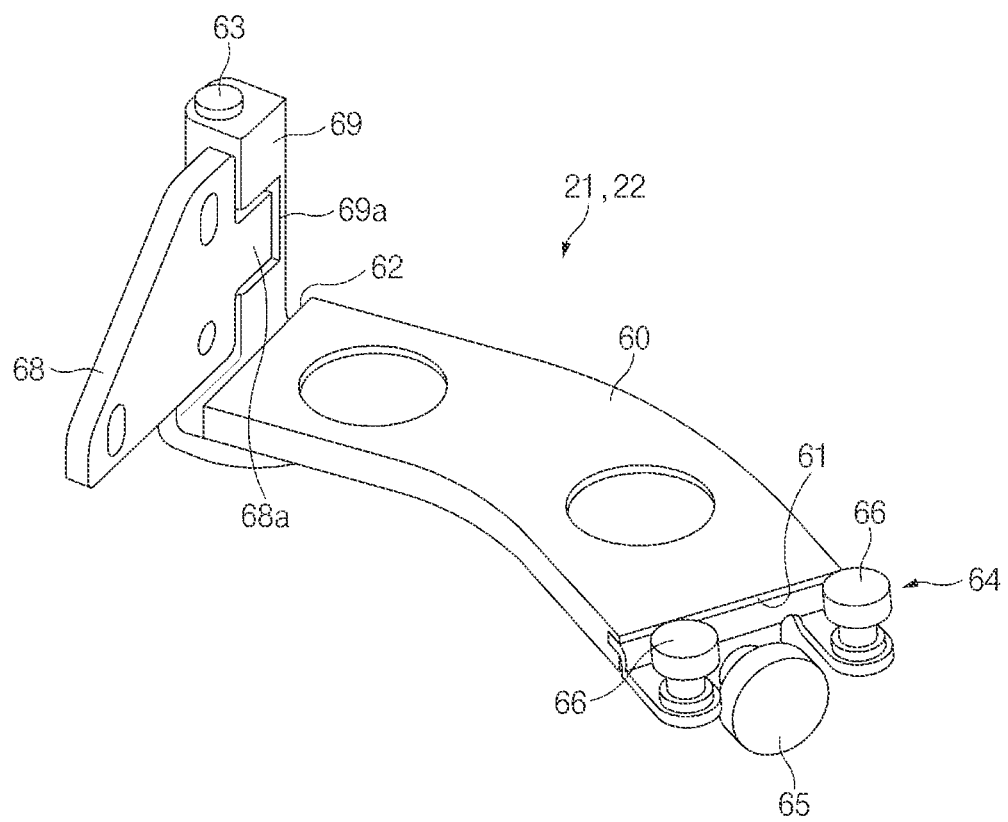
FIG. 8 illustrates a perspective view of an upper roller unit and a lower roller unit in a vehicle door opening and closing apparatus according to an exemplary embodiment of the present disclosure.

Referring to FIGS. 7 and 8, each of the upper roller unit 21 and the lower roller unit 22 may include a roller bracket 64 having rollers 65 and 66 rolling along the rails 11 and 12, and a body 60 connecting the roller bracket 64 and the vehicle door 5.

The roller bracket 64 may rotatably support the rollers 65 and 66, and the rollers 65 and 66 may roll along the upper rail 11 and the lower rail 12. As illustrated in FIG. 8, a middle roller 65 and two side rollers 66 disposed on both sides of the middle roller 65 may be rotatably mounted on the roller bracket 64. A rotation axis of the middle roller 65 may be perpendicular to a rotation axis of the side roller 66.

The body 60 may be curved so as not to contact the first extension portion 51 and the second extension portion 52. The body 60 may have a first end portion 61 facing the interior side of the vehicle, and a second end portion 62 facing the exterior side of the vehicle. The first end portion 61 of the body 60 may be fixed to the roller bracket 64 by welding, using fasteners, and/or the like, and the second end portion 62 of the body 60 may be pivotally connected to the vehicle door 5 through a pivot pin 63. The vehicle door 5 may swing around the pivot pin 63 adjacent to the second end portion 62 of the body 60.

Referring to FIGS. 7 and 8, the roller bracket 64 may be directly connected to the first end portion 61 of the body 60 by welding, using fasteners, and/or the like, and the second end portion 62 of the body 60 may be pivotally connected to the vehicle door 5 through the pivot pin 63. A first pivot bracket 68 may be fixed to the vehicle door 5 by welding, using fasteners, and/or the like, and a second pivot bracket 69 may be fixed to the second end portion 62 of the body 60 by welding, using fasteners, and/or the like. The first pivot bracket 68 may have a lug 68a, and the second pivot bracket 69 may have a recess 69a. The lug 68a of the first pivot bracket 68 may be inserted into the recess 69a of the second pivot bracket 69, and the pivot pin 63 may pass through the lug 68a of the first pivot bracket 68 and the second pivot bracket 69. The upper rotation axis CX1 and the lower rotation axis CX2 may be defined by the pivot pin 63. For example, the upper rotation axis CX1 and the lower rotation axis CX2 may be a virtual axis extending vertically along a center point of the pivot pin 63, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2. The upper hold lock 31 may be fixed to the body 60 of the upper roller unit 21, and the lower hold lock 32 may be fixed to the body 60 of the lower roller unit 22.

When the upper hold lock 31 firmly holds the body 60 of the upper roller unit 21 in the first closed position CP1 and the lower hold lock 32 firmly holds the body 60 of the lower roller unit 22 in the first closed position CP1, the vehicle door 5 may swing around the upper rotation axis CX1 of the upper roller unit 21 and the lower rotation axis CX2 of the lower roller unit 22. The vehicle door 5 may move between the second closed position CP2 in which the vehicle door 5 is closed and the second open position OP2 in which the vehicle door 5 is opened.

Figure 10:
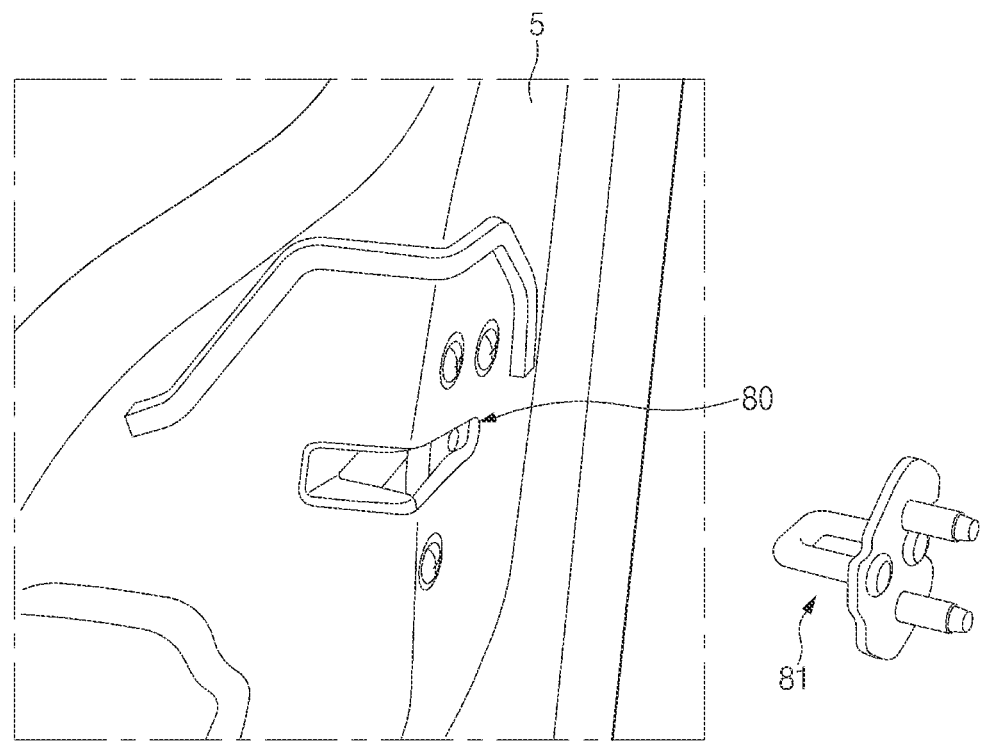
FIG. 10 illustrates a main latch mounted on a vehicle door and a main striker.

Referring to FIG. 10, a main latch 80 may be mounted on a rear end of the vehicle door 5, and a main striker 81 may be fixed to the vehicle body 1. The main latch 80 may releasably engage with the main striker 81. When the vehicle door 5 is in the first closed position CP1 or the second closed position CP2, the main latch 80 may engage with the main striker 81 by an engaging operation of the outside handle 6 so that the vehicle door 5 may be locked in the first closed position CP1 or the second closed position CP2. When the vehicle door 5 is in the first closed position CP1 or the second closed position CP2, the main latch 80 may release the main striker 81 by a release operation of the outside handle 6 so that the vehicle door 5 may be allowed to move in the sliding mode or the swing mode. When the vehicle door 5 is held in the first closed position CP1 and the main latch 80 releases the main striker 81, a center roller unit 23 may be released from the center rail 13, and thus the vehicle door 5 may be opened and closed in the swing mode.

The vehicle door opening and closing apparatus, according to exemplary embodiments of the present disclosure, may further include the center rail 13 mounted at a central portion of the vehicle body 1, and the center roller unit 23 guided along the center rail 13.

Referring to FIGS. 1 and 3, the center rail 13 may extend from a rear edge of the door aperture 3 in the longitudinal direction of the vehicle. The center roller unit 23 may be pivotally mounted on a central portion of the vehicle door 5. In particular, the center roller unit 23 may be mounted in a position adjacent to the rear end of the vehicle door 5. The center roller unit 23 may be guided along the center rail 13.

Figure 11:
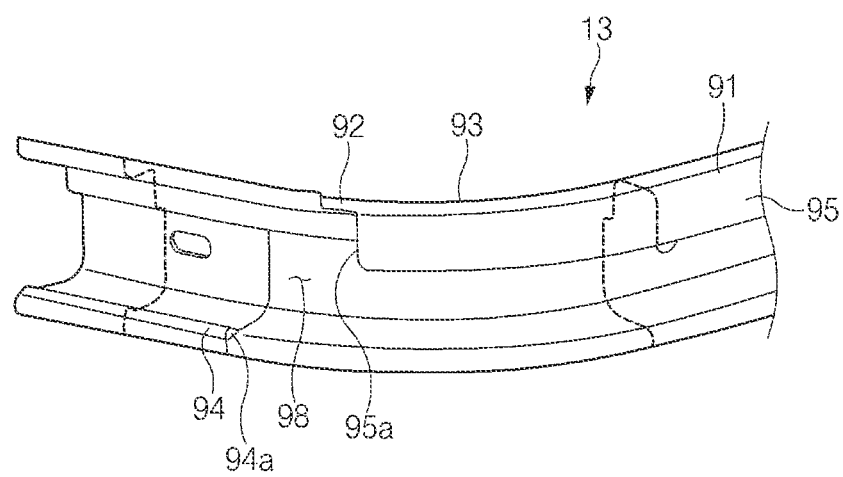
FIG. 11 illustrates a perspective view of a center rail in a vehicle door opening and closing apparatus according to an exemplary embodiment of the present disclosure.

Referring to FIG. 11, the center rail 13 may include a sliding guide 91 extending straightly in the longitudinal direction of the vehicle, and a swing guide 92 extending from the sliding guide 91 toward the interior side of the vehicle. The swing guide 92 may be bent at a predetermined angle with respect to the sliding guide 91 through a bending portion 93, and the bending portion 93 may be curved at a predetermined radius.

Figure 12:
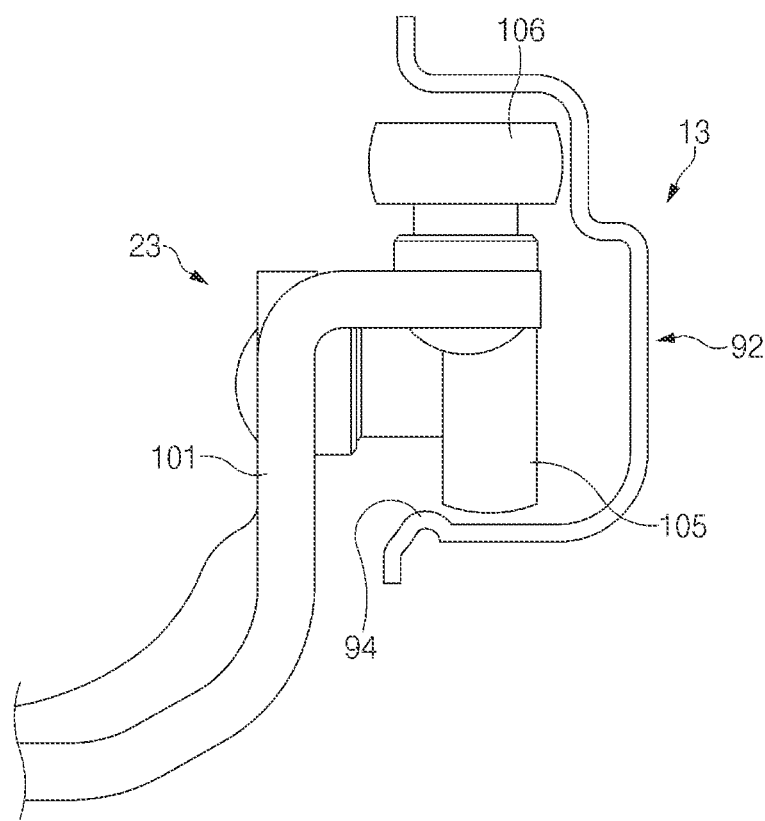
FIG. 12 illustrates a cross-sectional view of a swing guide of a center rail.
Figure 13:
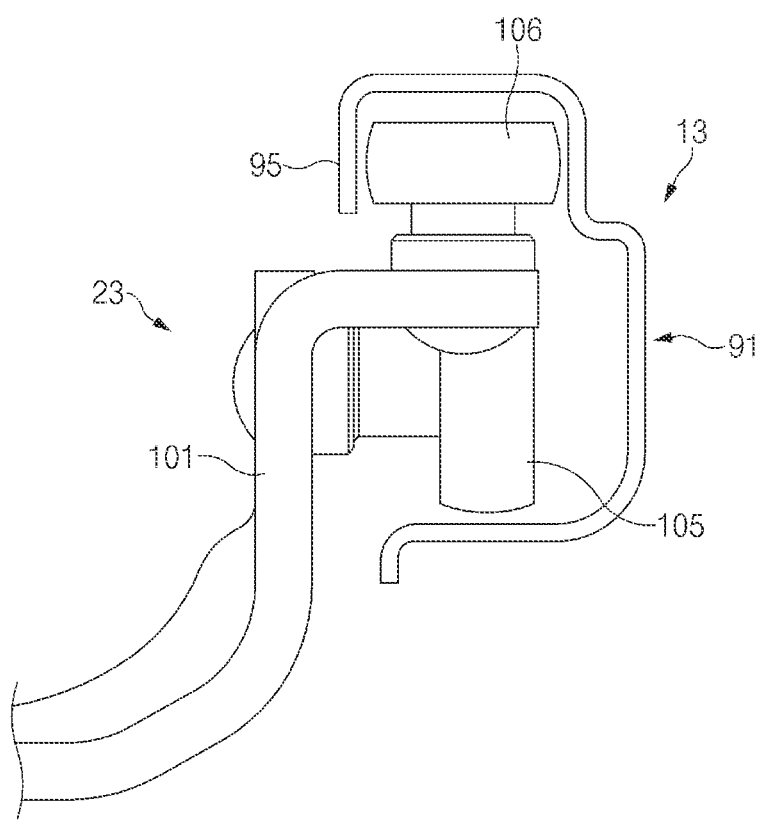
FIG. 13 illustrates a cross-sectional view of a sliding guide of a center rail.
Figure 14:
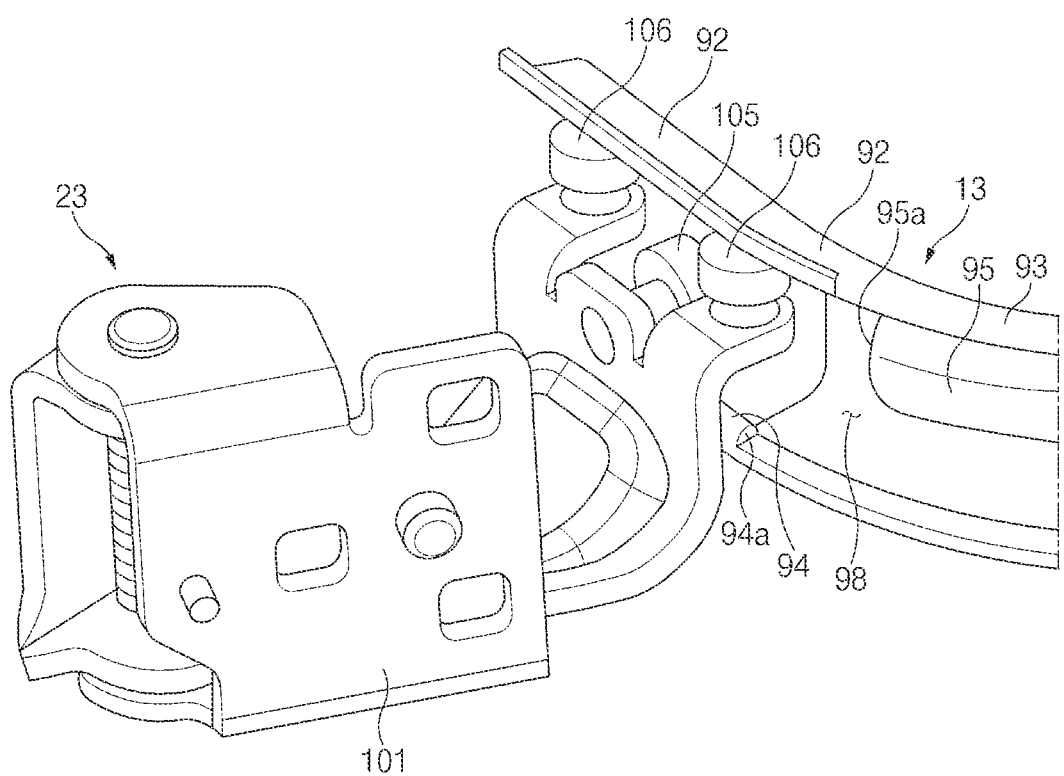
FIG. 14 illustrates a structure in which a center roller unit is held in a swing guide of a center rail.

Referring to FIGS. 12 to 14, the center roller unit 23 may include a roller bracket 101 and rollers 105 and 106 rotatably mounted on the roller bracket 101. The roller bracket 101 may be pivotally mounted on the central portion of the vehicle door 5. The rollers 105 and 106 may roll along the center rail 13. As illustrated in FIG. 14, a middle roller 105 and two side rollers 106 disposed on both sides of the middle roller 105 may be rotatably mounted on the roller bracket 101. A rotation axis of the middle roller 105 may be perpendicular to a rotation axis of the side roller 106. The rollers 105 and 106 of the center roller unit 23 may be located on an upper portion of the center rail 13.

When the vehicle door 5 slides in the longitudinal direction of the vehicle as the sliding mode is selected, the sliding guide 91 may guide the rollers 105 and 106 of the center roller unit 23.

Referring to FIGS. 11 and 13, the sliding guide 91 may include a stopper wall 95 preventing the rollers 105 and 106 of the center roller unit 23 from being separated from the sliding guide 91. The sliding guide 91 may have an opening which is open to the exterior of the vehicle, and the stopper wall 95 may be located above the opening of the sliding guide 91. In particular, the stopper wall 95 may be located to face the rollers 105 and 106 of the center roller unit 23 so that the stopper wall 95 may guide the movement of the rollers 105 and 106. The stopper wall 95 may extend along a length of the sliding guide 91 and a length of the bending portion 93. The stopper wall 95 may protrude vertically downward from an upper end of the sliding guide 91. As the stopper wall 95 closes the upper portion of the sliding guide 91 and an upper portion of the bending portion 93, the center roller unit 23 may be prevented from moving away from the sliding guide 91 toward the exterior side of the vehicle as illustrated in FIG. 13.

When the vehicle door 5 is opened and closed in the swing mode as the swing mode is selected, the swing guide 92 may guide the rollers 105 and 106 of the center roller unit 23 to be released from the center rail 13.

An exterior side of the swing guide 92 may be entirely open toward the exterior space of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along a swing trajectory T1, the middle roller 105 of the center roller unit 23 may be guided along the guide projection 94 as illustrated in FIG. 12.

Figure 15:
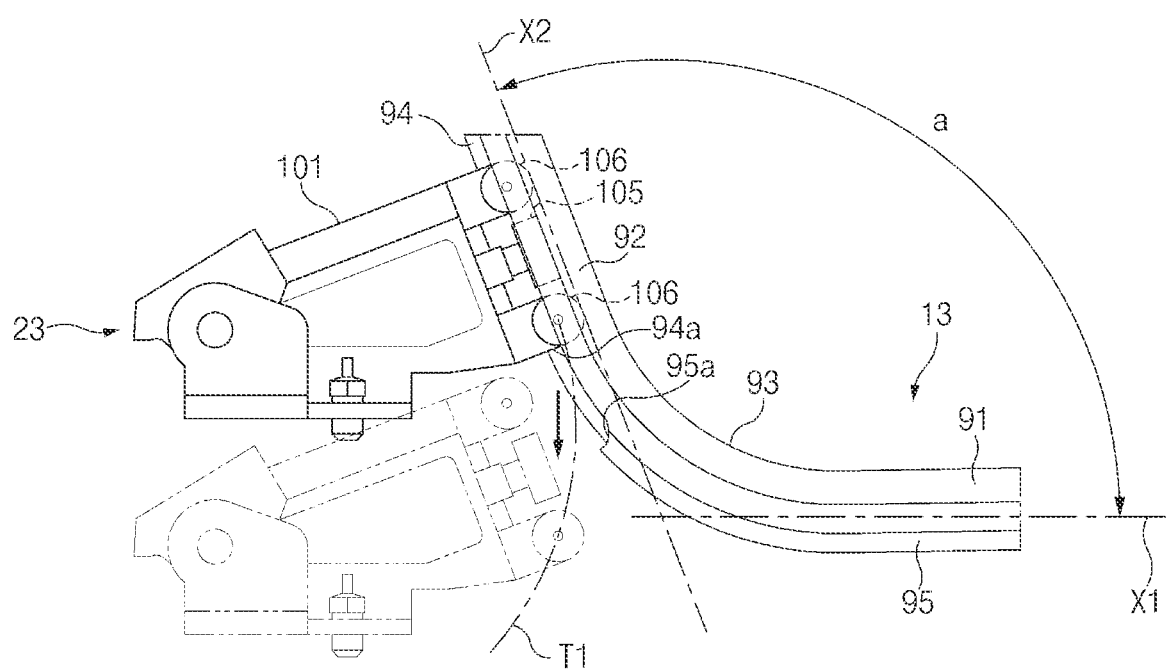
FIG. 15 illustrates an operation in which a center roller unit is released from a swing guide of a center rail.

A front end 95a of the stopper wall 95 of the sliding guide 91 and a rear end 94a of the guide projection 94 may be located so as not to interfere with the swing trajectory T1 of the vehicle door 5. In addition, as illustrated in FIG. 15, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the rollers 105 and 106 of the center roller unit 23 may easily be released from the swing guide 92 of the center rail 13 or may easily be received in the swing guide 92 of the center rail 13.

The center rail 13 may include a space 98 allowing the rollers 105 and 106 of the center roller unit 23 to be released from the center rail 13 or be received in the center rail 13 when the vehicle door 5 swings in the swing mode. The space 98 may be defined between the front end 95a of the stopper wall 95 and the rear end 94a of the guide projection 94 as the front end 95a of the stopper wall 95 and the rear end 94a of the guide projection 94 are spaced apart from each other. Due to the space 98, there is no interference when the rollers 105 and 106 of the center roller unit 23 are released from the center rail 13 or are received in the center rail 13 in the swing mode.

Meanwhile, according to the exemplary embodiment illustrated in FIGS. 11 to 15, when malfunction of the main latch 80 or deformation of the vehicle door 5 or the swing guide 92 due to an external impact occurs in the sliding mode, the rollers 105 and 106 of the center roller unit 23 may be separated from the swing guide 92 of the center rail 13, and thus the vehicle door 5 may fail to be easily opened and closed in the sliding mode. In order to deal with this problem, the vehicle door opening and closing apparatus, according to exemplary embodiments of the present disclosure, may further include a variable stopper mechanism 110 capable of preventing the rollers 105 and 106 of the center roller unit 23 from being separated from the center rail 13 in the sliding mode.

Figure 25:
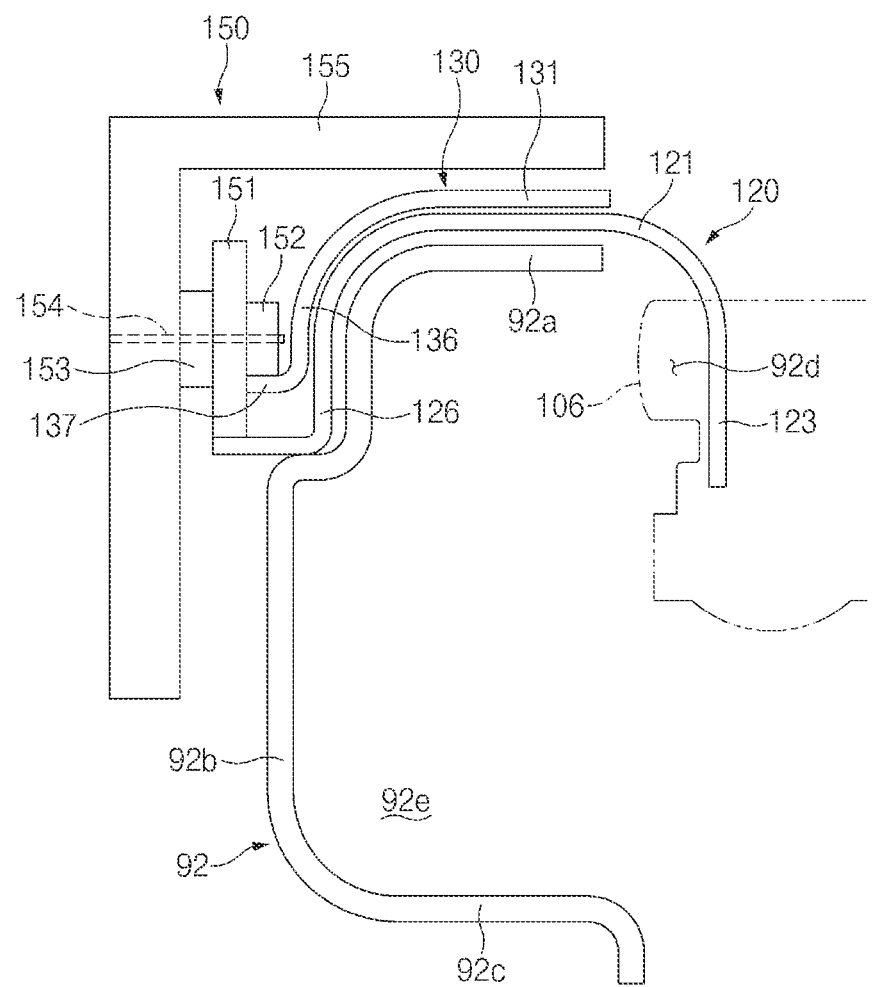
FIG. 25 illustrates a cross-sectional view, taken along line B-B of FIG. 23.

Referring to FIG. 25, the swing guide 92 may include a top wall 92a, an inboard sidewall 92b facing the interior space of the vehicle, a bottom wall 92c, an exterior-side opening 92d open to the exterior space of the vehicle, and a cavity 92e. The cavity 92e may be defined by the top wall 92a, the inboard sidewall 92b, and the bottom wall 92c, and the cavity 92e may receive the rollers 105 and 106 of the center roller unit 23.

Referring to FIGS. 16 to 26, the variable stopper mechanism 110, according to exemplary embodiments of the present disclosure, may cover a portion (upper portion) of the exterior-side opening 92d of the swing guide 92 in the sliding mode, thereby preventing the rollers 105 and 106 of the center roller unit 23 from being separated from the center rail 13, and may uncover the exterior-side opening 92d of the swing guide 92 in the swing mode, thereby allowing the rollers 105 and 106 of the center roller unit 23 to be released from the center rail 13.

Figure 16:
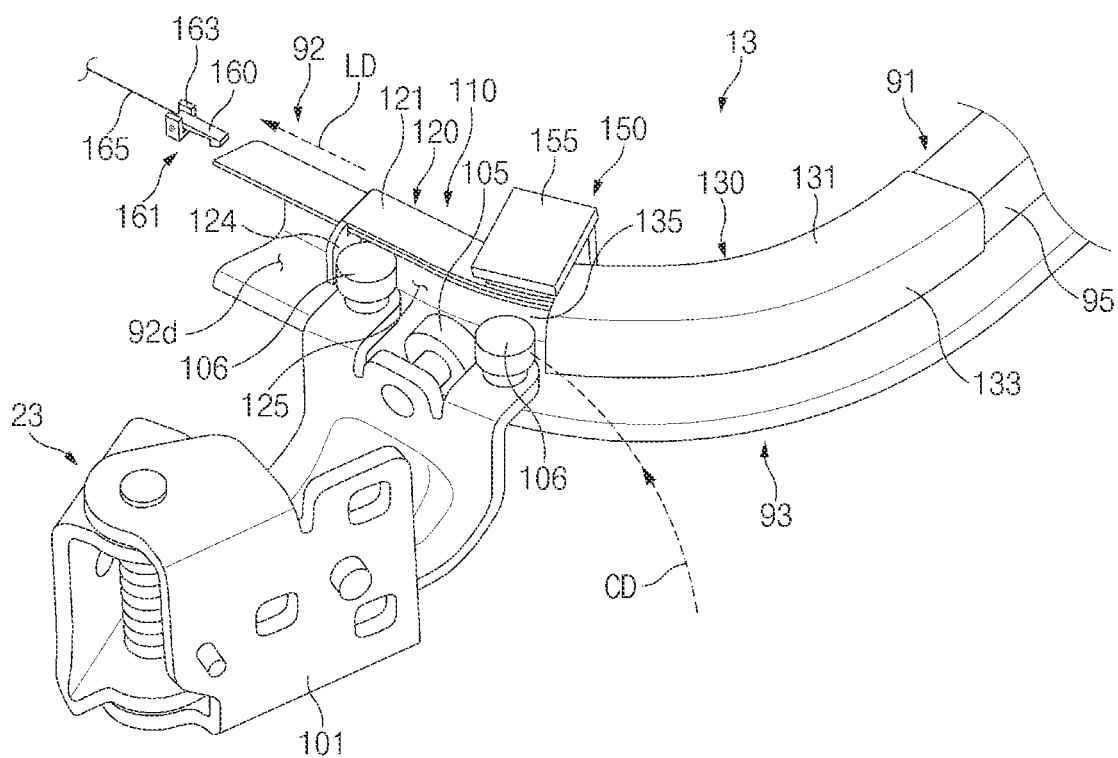
FIG. 16 illustrates a perspective view of a variable stopper mechanism in a vehicle door opening and closing apparatus according to an exemplary embodiment of the present disclosure, in a state in which a first variable stopper and a second variable stopper move to an uncovering position.
Figure 17:
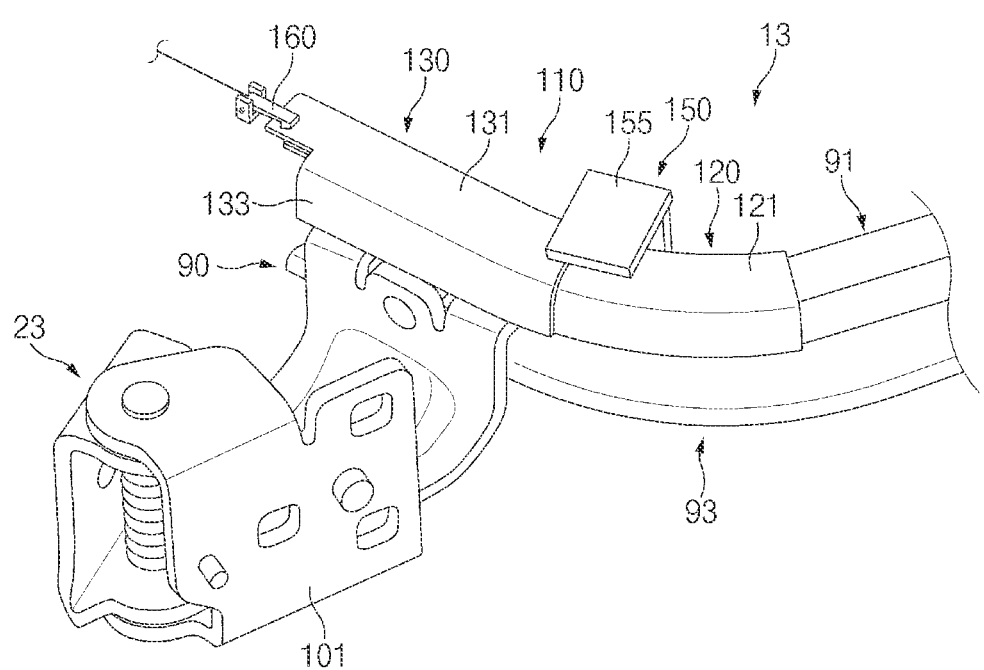
FIG. 17 illustrates a perspective view of a variable stopper mechanism in a vehicle door opening and closing apparatus according to an exemplary embodiment of the present disclosure, in a state in which a first variable stopper and a second variable stopper move to a covering position.

Referring to FIGS. 16 and 17, the variable stopper mechanism 110 may include a first variable stopper 120 movably mounted on the swing guide 92 of the center rail 13, a second variable stopper 130 movably mounted on the first variable stopper 120, and a power transmission mechanism 150 transmitting a force applied to the first variable stopper 120 to the second variable stopper 130.

Figure 18:
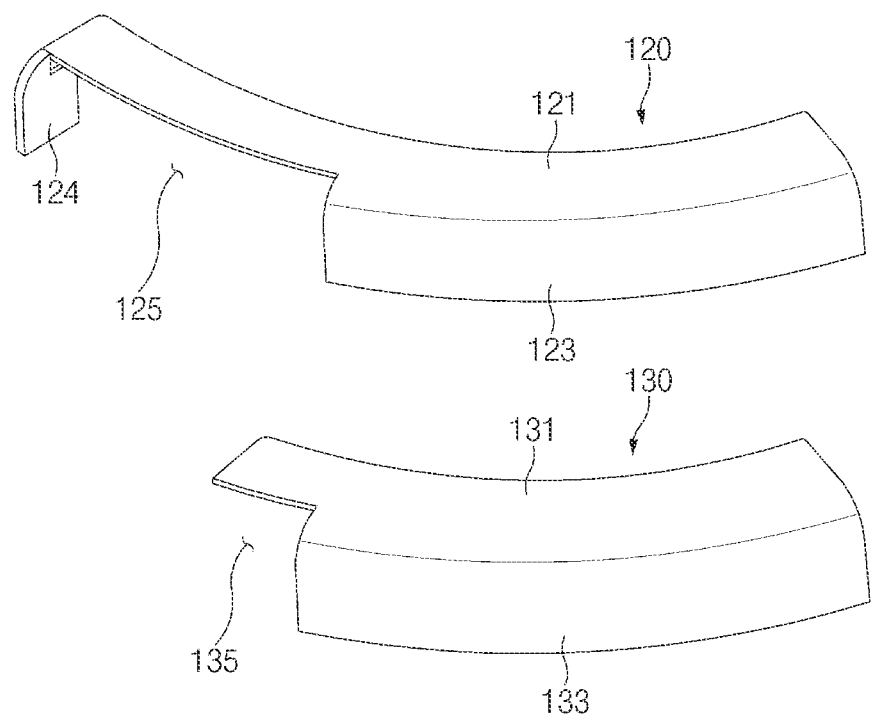
FIG. 18 illustrates an exploded perspective view of the first variable stopper and the second variable stopper in the variable stopper mechanism illustrated in FIGS. 16 and 17.
Figure 19:
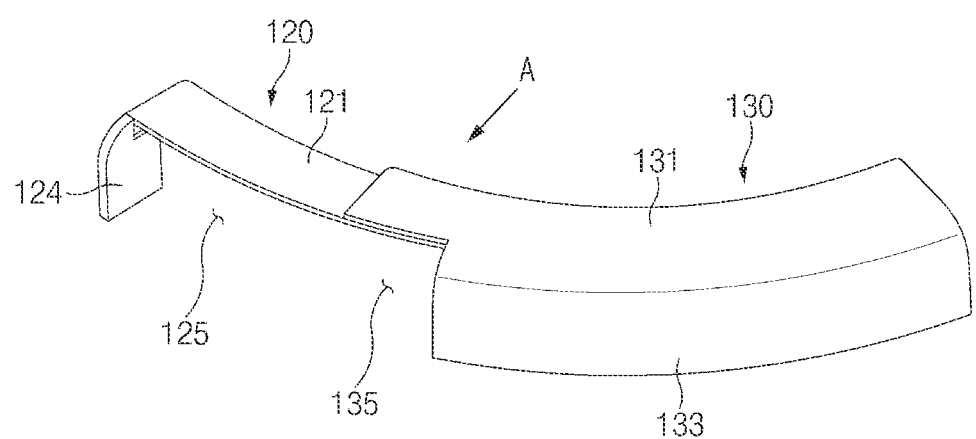
FIG. 19 illustrates a perspective view of the first variable stopper and the second variable stopper in the variable stopper mechanism illustrated in FIGS. 16 and 17.
Figure 20:
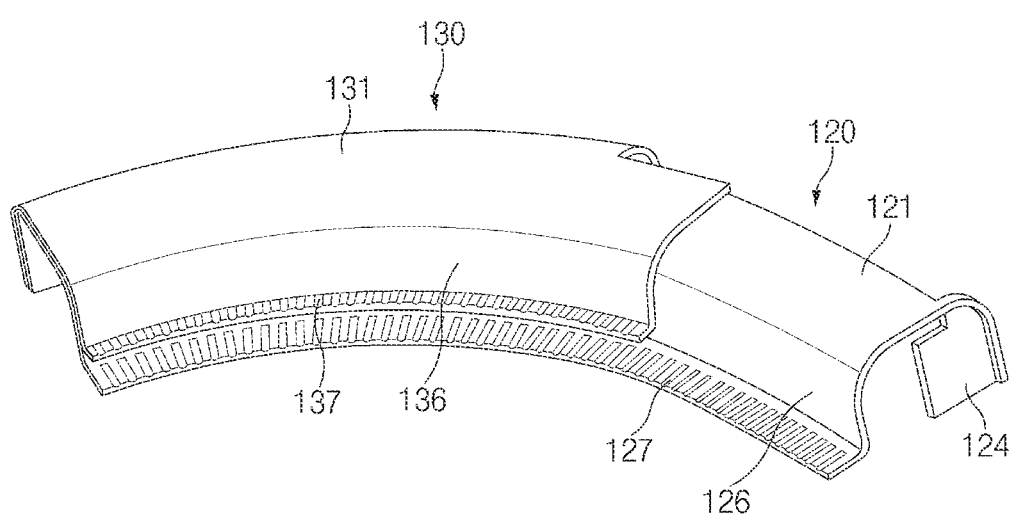
FIG. 20 illustrates a view which is viewed from a direction indicated by arrow A of FIG. 19.
Figure 21:
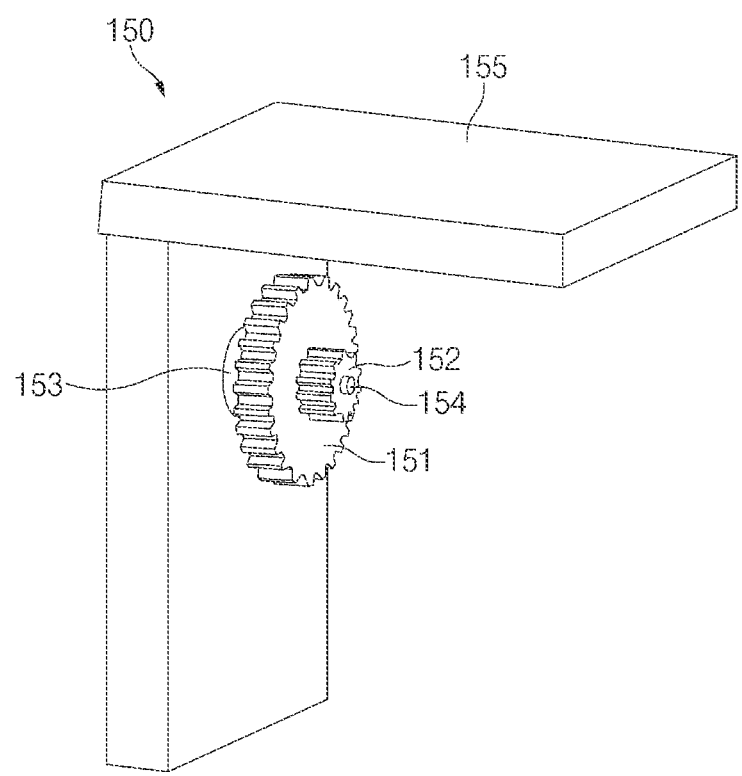
FIG. 21 illustrates a power transmission mechanism of the variable stopper mechanism illustrated in FIGS. 16 and 17.
Figure 22:
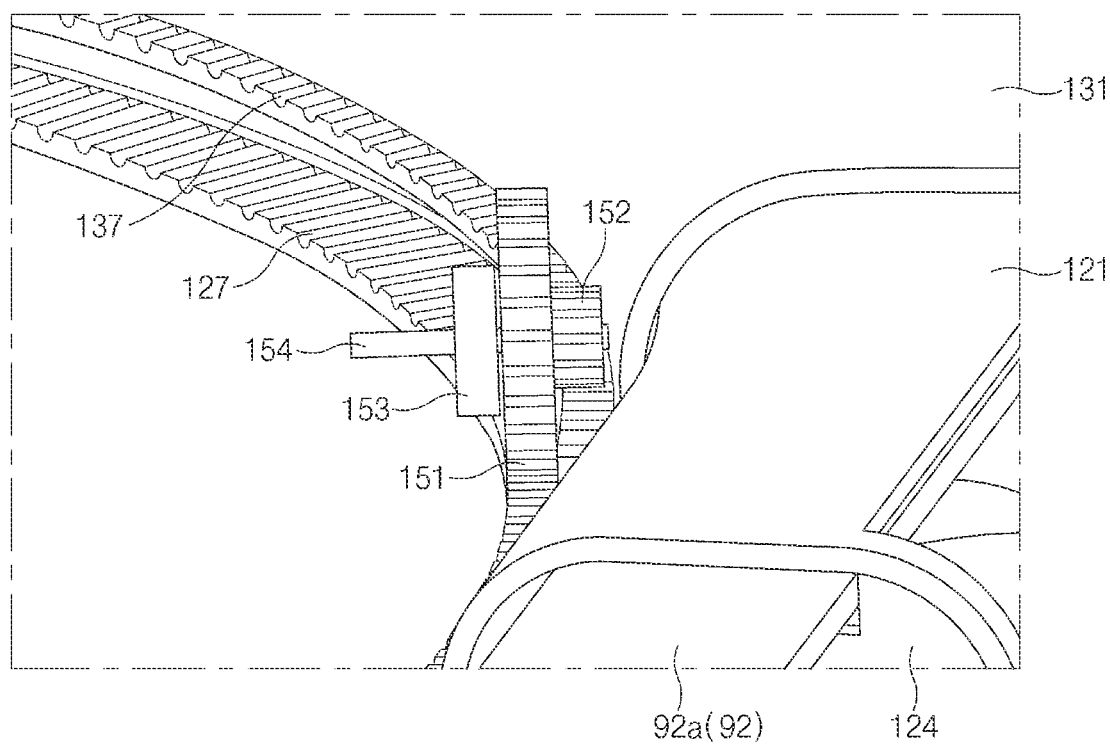
FIG. 22 illustrates a state in which a first gear and a second gear in the power transmission mechanism illustrated in FIG. 21 mesh with a first rack and a second rack.

Referring to FIGS. 18 to 20, the first variable stopper 120 may have a curved shape corresponding to that of the sliding guide 91 and the swing guide 92 adjacent to the bending portion 93 of the center rail 13. Thus, the first variable stopper 120 may be movable along the sliding guide 91 and the swing guide 92 adjacent to the bending portion 93 of the center rail 13. Specifically, the first variable stopper 120 may include a first top wall 121, a first outboard sidewall 123 facing the exterior space of the vehicle, a first exterior-side opening 125 open to the exterior space of the vehicle, and a first inboard sidewall 126 facing the interior space of the vehicle.

The first top wall 121 may have a curved shape corresponding to that of the sliding guide 91 and the swing guide 92 adjacent to the bending portion 93 of the center rail 13. In particular, the first top wall 121 may be movable along the top wall 92a of the swing guide 92.

The first outboard sidewall 123 may have a shape corresponding to that of the stopper wall 95 of the center rail 13, and the first outboard sidewall 123 may be movable along the stopper wall 95 of the sliding guide 91 and the exterior-side opening 92d of the swing guide 92.

The first exterior-side opening 125 may be aligned with the exterior-side opening 92d of the swing guide 92. A length of the first exterior-side opening 125 may be less than that of the exterior-side opening 92d of the swing guide 92, and the rollers 105 and 106 of the center roller unit 23 may be received in the swing guide 92 or be released from the swing guide 92 through the first exterior-side opening 125. The first exterior-side opening 125 may be movable along the exterior-side opening 92d of the swing guide 92.

The first inboard sidewall 126 may have a curved shape corresponding to that of the sliding guide 91 and the swing guide 92 adjacent to the bending portion 93 of the center rail 13. The first inboard sidewall 126 may be movable along the inboard sidewall 92b of the swing guide 92.

A first rack 127 may extend along a bottom edge of the first inboard sidewall 126, and the first rack 127 may have a curved shape. The first rack 127 may have a plurality of teeth.

The first variable stopper 120 may further include a touch wall 124 with which the side rollers 106 of the center roller unit 23 come into contact, and the touch wall 124 may extend downwardly from the first top wall 121. The touch wall 124 may have a flat surface perpendicular to the first top wall 121.

Referring to FIGS. 18 to 20, the second variable stopper 130 may overlap the first variable stopper 120, and be movable along the first variable stopper 120. The second variable stopper 130 may have a curved shape corresponding to that of the sliding guide 91 and the swing guide 92 adjacent to the bending portion 93 of the center rail 13.

As the first variable stopper 120 moves, the second variable stopper 130 may move with the first variable stopper 120 in the same direction through the power transmission mechanism 150. A length of the second variable stopper 130 may be less than that of the first variable stopper 120. Specifically, the second variable stopper 130 may include a second top wall 131, a second outboard sidewall 133 facing the exterior space of the vehicle, a second exterior-side opening 135 open to the exterior space of the vehicle, and a second inboard sidewall 136 facing the interior space of the vehicle.

The second top wall 131 may have a curved shape corresponding to that of the sliding guide 91 and the swing guide 92 adjacent to the bending portion 93 of the center rail 13, and the second top wall 131 may be located on the first top wall 121. A length of the second top wall 131 may be less than that of the first top wall 121. As the second variable stopper 130 moves along the sliding guide 91 and the swing guide 92 adjacent to the bending portion 93 of the center rail 13, the second top wall 131 may move along the first top wall 121.

The second outboard sidewall 133 may have a shape corresponding to that of the stopper wall 95 of the center rail 13 and the first outboard sidewall 123, and a length of the second outboard sidewall 133 may be less than that of the first outboard sidewall 123. The second outboard sidewall 133 may be movable along the first outboard sidewall 123 and the exterior-side opening 92d of the swing guide 92, so that the second outboard sidewall 133 may cover or uncover the exterior-side opening 92d of the swing guide 92. Specifically, the second outboard sidewall 133 may be positioned to correspond to the rollers 105 and 106 of the center roller unit 23, and the second outboard sidewall 133 may cover or uncover the upper portion of the exterior-side opening 92d.

Figure 23:
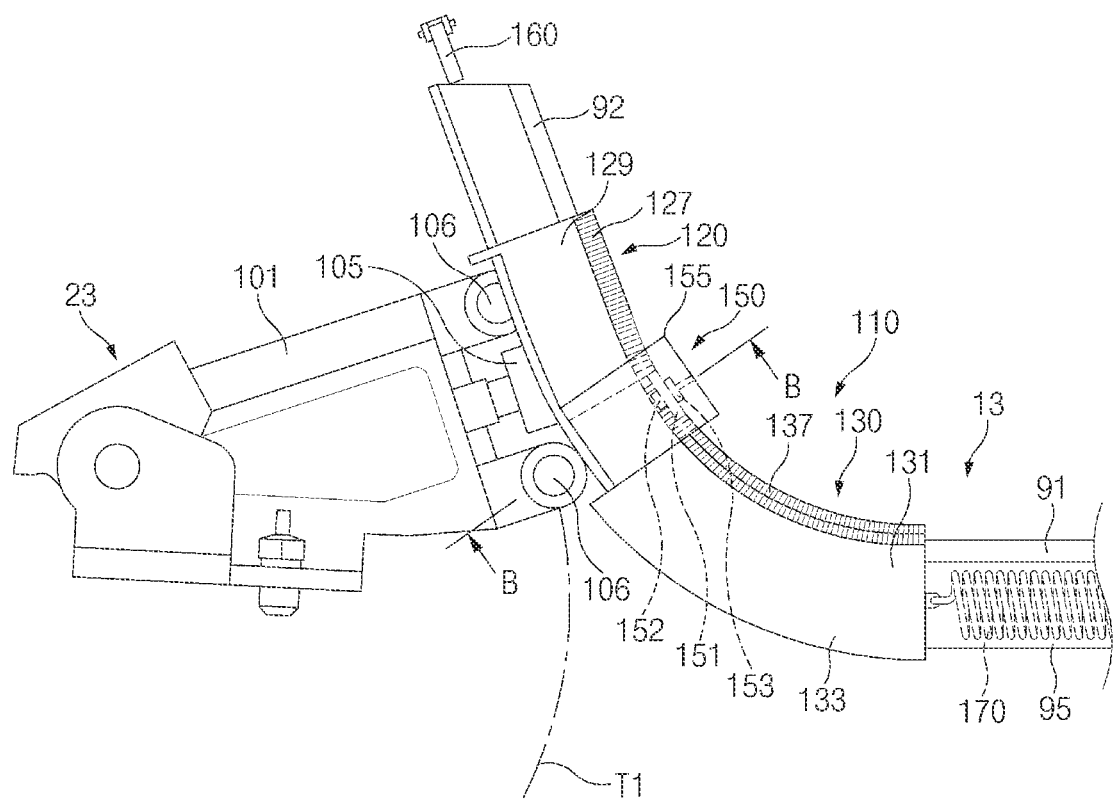
FIG. 23 illustrates a plan view of a variable stopper mechanism in a vehicle door opening and closing apparatus according to an exemplary embodiment of the present disclosure, in a state in which a first variable stopper and a second variable stopper move to an uncovering position.

The second exterior-side opening 135 may be aligned with the first exterior-side opening 125 and the exterior-side opening 92d of the swing guide 92, and a length of the second exterior-side opening 135 may be less than that of the first exterior-side opening 125. The second exterior-side opening 135 may be movable along the first exterior-side opening 125 and the exterior-side opening 92d of the swing guide 92. As illustrated in FIGS. 16 and 23, when the second exterior-side opening 135 is aligned with the first exterior-side opening 125 and the exterior-side opening 92d of the swing guide 92, the exterior-side opening 92d of the swing guide 92 may be uncovered so that the rollers 105 and 106 of the center roller unit 23 may be received in the swing guide 92 or be released from the swing guide 92 through the second exterior-side opening 135.

The second inboard sidewall 136 may have a curved shape corresponding to that of the first inboard sidewall 126, and the second inboard sidewall 136 may be movable along the first inboard sidewall 126. A second rack 137 may extend along a bottom edge of the second inboard sidewall 136, and the second rack 137 may have a curved shape. The second rack 137 may have a plurality of teeth, and a length of the second rack 137 may be less than that of the first rack 127.

Referring to FIGS. 21 to 25, the power transmission mechanism 150 may include a first gear 151 and a second gear 152 coaxially connected to the first gear 151. The first gear 151 may mesh with the first rack 127 of the first variable stopper 120, and the second gear 152 may mesh with the second rack 137 of the second variable stopper 130. The first gear 151 and the second gear 152 may be rotatably mounted on a bracket 155 through a common shaft 154. As the second gear 152 is integrally connected to the first gear 151, the first gear 151 and the second gear 152 may form a unitary one-piece structure. The first gear 151 may be rotatably supported to the bracket 155 through a bushing 153. The bracket 155 may be fixed to the vehicle body. The first gear 151 may be a drive gear, and the second gear 152 may be a driven gear. A diameter of the first gear 151 may be greater than that of the second gear 152. A gear ratio of the second gear 152 and the first gear 151 may be defined as a speed increasing ratio such as 1:2 or 1:3, so that the second gear 152 may rotate two or three times faster than the first gear 151. Thus, when the first variable stopper 120 moves, the second variable stopper 130 may move two or three times faster than the first variable stopper 120.

When the rollers 105 and 106 of the center roller unit 23 are received in the cavity 92e of the swing guide 92 (see a direction indicated by arrow CD in FIG. 16) as the vehicle door 5 is closed in the swing mode, the side rollers 106 of the center roller unit 23 may push the touch wall 124 of the first variable stopper 120 and the first variable stopper 120 may move to an end portion of the swing guide 92 (see a direction indicated by arrow LD in FIG. 16). When the first variable stopper 120 is advanced toward the end portion of the swing guide 92, the second variable stopper 130 may be moved together with the first variable stopper 120 toward the end portion of the swing guide 92 by the power transmission mechanism 150. Specifically, when the first variable stopper 120 is advanced toward the end portion of the swing guide 92, the first gear 151 meshing with the first rack 127 of the first variable stopper 120 may rotate, and accordingly the second gear 152 may rotate together with the first gear 151 in the same direction. The second gear 152 may rotate two or three times faster than the first gear 151, and accordingly the second variable stopper 130 may be advanced two or three times faster than the first variable stopper 120.

Referring to FIG. 17, when the second variable stopper 130 is fully advanced toward the end portion of the swing guide 92, the second outboard sidewall 133 of the second variable stopper 130 may cover the upper portion of the exterior-side opening 92d of the swing guide 92. That is, as the second variable stopper 130 covers the upper portion of the exterior-side opening 92d of the swing guide 92, the second variable stopper 130 may prevent the rollers 105 and 106 of the center roller unit 23 from being separated from the swing guide 92. When the second variable stopper 130 covers the upper portion of the exterior-side opening 92d of the swing guide 92, the vehicle door 5 may be reliably opened and closed in the sliding mode, and the rollers 105 and 106 of the center roller unit 23 may be prevented from being separated from the swing guide 92.

Figure 24:
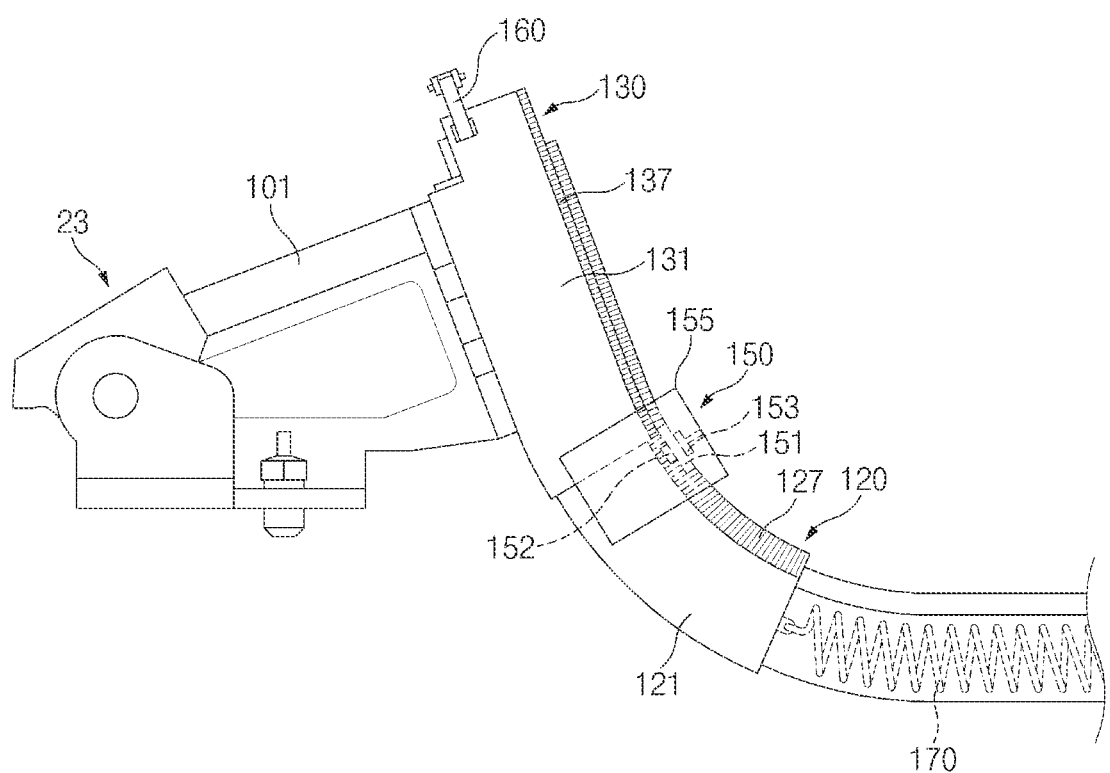
FIG. 24 illustrates a plan view of a variable stopper mechanism in a vehicle door opening and closing apparatus according to an exemplary embodiment of the present disclosure, in a state in which a first variable stopper and a second variable stopper move to a covering position.

The second variable stopper 130 may move with the first variable stopper 120 in the same direction by the power transmission mechanism 150. In particular, the first variable stopper 120 and the second variable stopper 130 may move between a covering position (see FIGS. 17 and 24) and an uncovering position (see FIGS. 16 and 23). Referring to FIGS. 17 and 24, the covering position refers to a position in which the second outboard sidewall 133 covers the portion (upper portion) of the exterior-side opening 92d of the swing guide 92, and referring to FIGS. 16 and 23, the uncovering position refers to a position in which the second outboard sidewall 133 uncovers the portion (upper portion) of the exterior-side opening 92d of the swing guide 92.

When the second variable stopper 130 is in the covering position, the center roller unit 23 may move along the swing guide 92 and the sliding guide 91 in the sliding mode. When the second variable stopper 130 is in the uncovering position, the center roller unit 23 may be released from the swing guide 92 or be received in the swing guide 92 in the swing mode.

Referring to FIG. 23, the first variable stopper 120 and the second variable stopper 130 may be biased toward the uncovering position by a biasing element 170. For example, the biasing element 170 may be a coil spring connected to the first variable stopper 120. As illustrated in FIG. 24, when the first variable stopper 120 is fully advanced toward the end portion of the swing guide 92 and the second variable stopper 130 moves to the covering position, the biasing element 170 may be tensioned. As illustrated in FIG. 23, when the first variable stopper 120 moves from the end portion of the swing guide 92 to the uncovering position, the biasing element 170 may be compressed.

The variable stopper mechanism 110 may include a locking lever 160 which locks the second variable stopper 130 so that the second variable stopper 130 may be kept in the covering position, and the locking lever 160 may be adjacent to the end portion of the swing guide 92.

Figure 26:
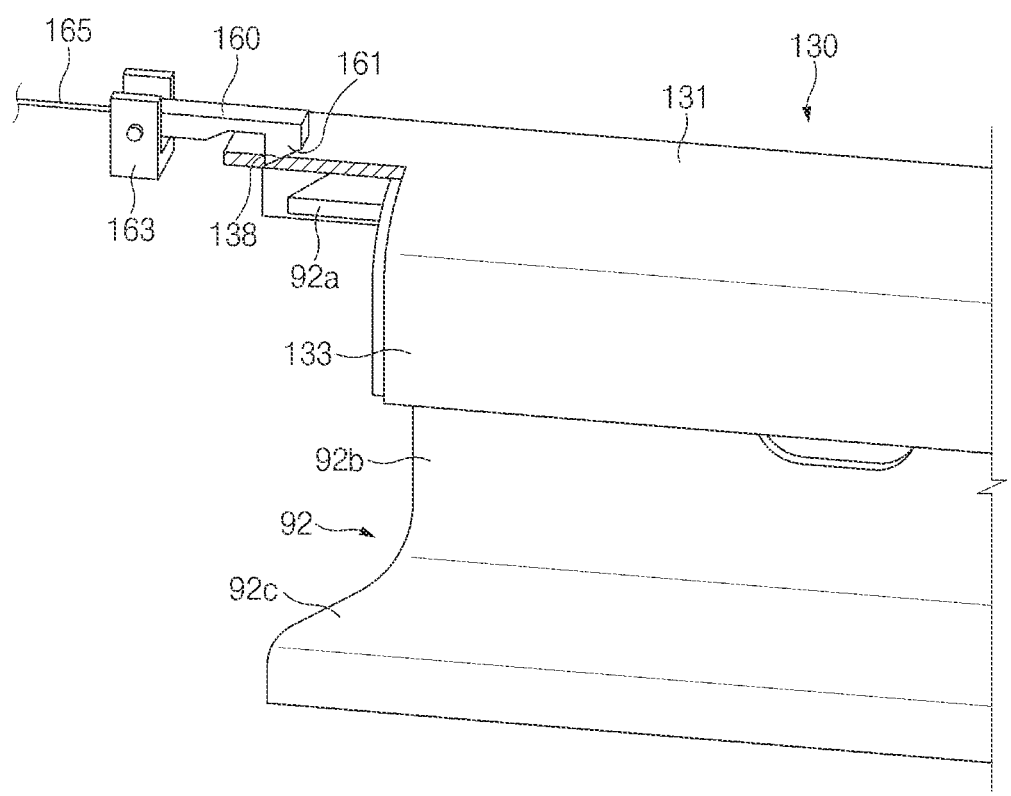
FIG. 26 illustrates a state in which a second variable stopper is locked by a locking lever in a variable stopper mechanism of a vehicle door opening and closing apparatus according to an exemplary embodiment of the present disclosure.

Referring to FIG. 26, the locking lever 160 may be pivotally mounted on a bracket 163, and the bracket 163 may be fixed to the vehicle body. The locking lever 160 may be connected to the outside handle 6 through a cable 165. The locking lever 160 may have a retention barb 161 provided on a free end thereof, and the second top wall 131 of the second variable stopper 130 may have a recess 138.

As the retention barb 161 of the locking lever 160 is inserted into the recess 138 of the second variable stopper 130, the second variable stopper 130 may be kept in the covering position in which it covers the exterior-side opening 92d of the swing guide 92. As the user pulls the outside handle 6 in the swing mode, the vehicle door 5 may swing outwards and the cable 165 may be pulled, so the locking lever 160 may pivot upwardly. Thus, the retention barb 161 of the locking lever 160 may be released from the recess 138 of the second variable stopper 130, and the first variable stopper 120 and the second variable stopper 130 may move to the uncovering position by a biasing force of the biasing element 170.

According to an exemplary embodiment, the first variable stopper 120 and the second variable stopper 130 may be made of a flexible material. For example, the first variable stopper 120 and the second variable stopper 130 may be made of a synthetic resin material such as polyvinyl chloride (PVC). Thus, the first variable stopper 120 and the second variable stopper 130 may slide smoothly along the swing guide 92, the bending portion 93, and the sliding guide 91 of the center rail 13.

According to another exemplary embodiment, the first variable stopper 120 and the second variable stopper 130 may be made of a composite material in which a plurality of reinforcing materials such as steel wires are embedded in a matrix (synthetic resin material), and thus stiffness of the first variable stopper 120 and the second variable stopper 130 may be improved.

According to another exemplary embodiment, the first variable stopper 120 and the second variable stopper 130 may have a curved structure in a longitudinal direction thereof.

FIGS. 1 to 26 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 27:
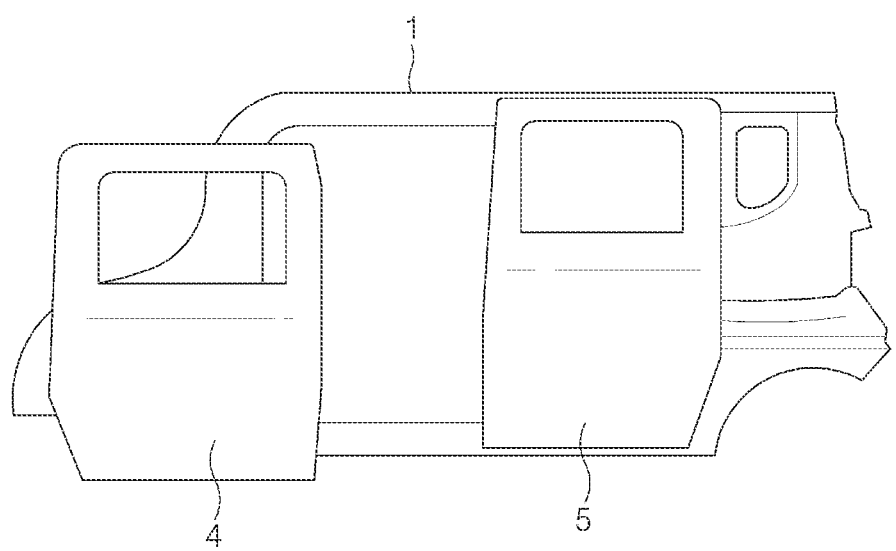
FIG. 27 illustrates a vehicle door opening and closing apparatus according to an exemplary embodiment of the present disclosure, which is applied to a front door of a vehicle, in a state in which the front door is opened in a sliding mode.
Figure 28:
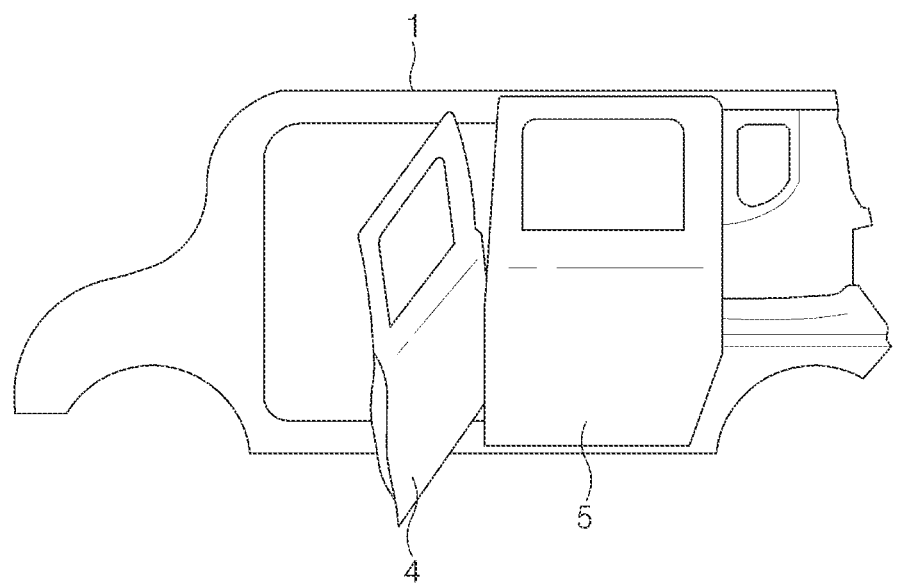
FIG. 28 illustrates a state in which the front door of FIG. 27 is opened in a swing mode.

FIGS. 27 and 28 illustrate the vehicle door opening and closing apparatus according to exemplary embodiments of the present disclosure applied to the front door 4. FIG. 27 illustrates a state in which the front door 4 is opened in the sliding mode, and FIG. 28 illustrates a state in which the front door 4 is opened in the swing mode.

Figure 29:
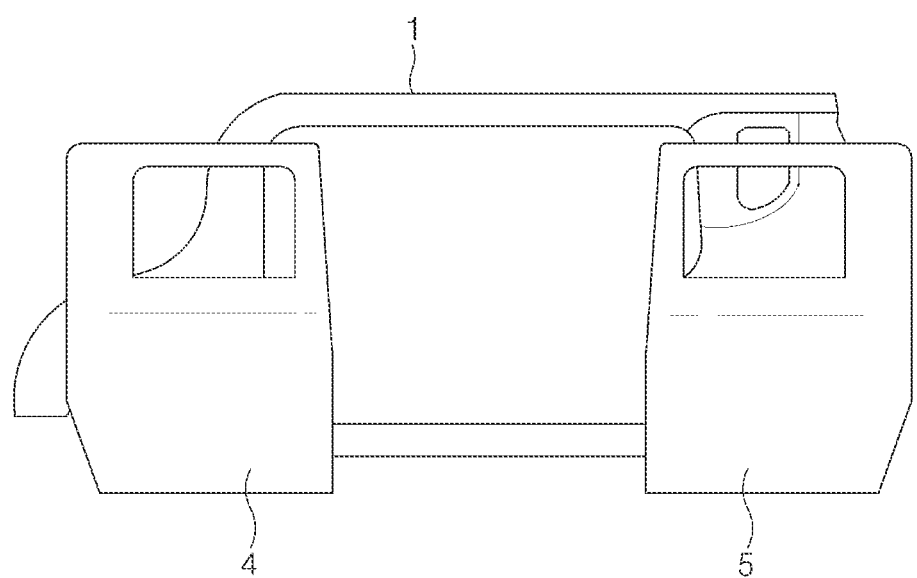
FIG. 29 illustrates a vehicle door opening and closing apparatus according to an exemplary embodiment of the present disclosure, which is applied to a front door and a rear door of a vehicle, in a state in which the front door and the rear door are opened in a sliding mode.
Figure 30:
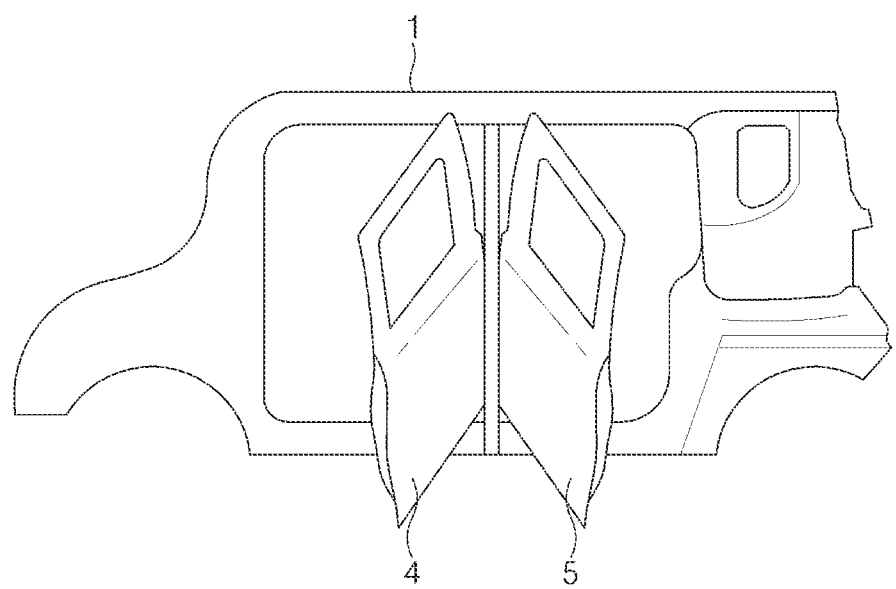
FIG. 30 illustrates a state in which the front door and the rear door of FIG. 29 are opened in a swing mode.

FIGS. 29 and 30 illustrate the vehicle door opening and closing apparatus according to exemplary embodiments of the present disclosure applied to both the front door 4 and the rear door 5. FIG. 29 illustrates a state in which the front door 4 and the rear door 5 are opened in the sliding mode, and FIG. 30 illustrates a state in which the front door 4 and the rear door 5 are opened in the swing mode.

As set forth above, the vehicle door opening and closing apparatus according to exemplary embodiments of the present disclosure may perform the opening and closing operations of the vehicle door by selectively switching the sliding mode and the swing mode, thereby meeting the needs of customers such as convenience and diversity. In addition, it may select the opening and closing operations of the vehicle door by taking the customer's situation and environment into consideration, thereby improving convenience and quality.

In particular, by preventing the center roller unit from being separated from the center rail in the sliding mode and allowing the center roller unit to be released from the center rail in the swing mode, the vehicle door may be reliably opened and closed in either the swing mode or the sliding mode.

In terms of vehicle specifications, the vehicle door opening and closing structure may be standardized, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door opening and closing apparatus, comprising:
    a vehicle door;
    a rail configured to be mounted on a vehicle body having a door aperture;
    a roller unit mounted on the vehicle door and configured to move along the rail and to allow the vehicle door to open and close in a sliding mode and in a swing mode;
    a sliding guide extending from a rear edge of the door aperture of the vehicle body and extending straightly in a longitudinal direction of the vehicle body;
    a swing guide bent from the sliding guide toward an interior of the vehicle body;
    a center roller unit mounted on the vehicle door and configured to be guided along the sliding guide and the swing guide; and
    a variable stopper mechanism configured to cover an exterior-side opening of the swing guide in the sliding mode and to uncover the exterior-side opening of the swing guide in the swing mode.

2. The apparatus according to claim 1, wherein the sliding guide and the swing guide form a center rail.

3. The apparatus according to claim 1, wherein the variable stopper mechanism includes:
    a first variable stopper configured to move along the swing guide;
    a second variable stopper configured to move along the first variable stopper; and
    a power transmission mechanism configured to transmit a force to the first variable stopper and the second variable stopper.

4. The apparatus according to claim 3, wherein the first variable stopper includes a touch wall, wherein rollers of the center roller unit are configured to come into contact with the touch wall.

5. The apparatus according to claim 3, wherein as the first variable stopper moves, the second variable stopper is configured to move with the first variable stopper in a same direction through the power transmission mechanism.

6. The apparatus according to claim 5, wherein:
    the first variable stopper has a first outboard sidewall and a first exterior-side opening aligned with the exterior-side opening of the swing guide; and
    the second variable stopper has a second outboard sidewall and a second exterior-side opening aligned with the exterior-side opening of the swing guide and the first exterior-side opening.

7. The according to claim 6, wherein the first variable stopper and the second variable stopper are configured to move between a covering position in which the second outboard sidewall covers the exterior-side opening of the swing guide and an uncovering position in which the second outboard sidewall uncovers the exterior-side opening of the swing guide.

8. The apparatus according to claim 7, further comprising a biasing element configured to bias the first variable stopper and the second variable stopper to the uncovering position.

9. The apparatus according to claim 7, wherein the variable stopper mechanism includes a locking lever configured to lock the second variable stopper so that the second outboard sidewall of the second variable stopper is kept in the covering position.

10. The apparatus according to claim 6, wherein:
a length of the first exterior-side opening is less than a length of the exterior-side opening of the swing guide; and
a length of the second exterior-side opening is less than the length of the first exterior-side opening.

11. The apparatus according to claim 3, wherein a length of the second variable stopper is less than a length of the first variable stopper.

12. The apparatus according to claim 3, wherein the first variable stopper and the second variable stopper are curved to correspond to the sliding guide and the swing guide.

13. An apparatus comprising:
a vehicle door;
a rail configured to be mounted on a vehicle body having a door aperture;
a roller unit mounted on the vehicle door and configured to move along the rail to allow the vehicle door to open and close in a sliding mode and in a swing mode;
a sliding guide extending from a rear edge of the door aperture of the vehicle body and extending straightly in a longitudinal direction of the vehicle body;
a swing guide bent from the sliding guide toward an interior of the vehicle body;
a center roller unit mounted on the vehicle door and configured to be guided along the sliding guide and the swing guide; and
a variable stopper mechanism configured to cover an exterior-side opening of the swing guide in the sliding mode and to uncover the exterior-side opening of the swing guide in the swing mode, wherein the variable stopper mechanism includes:
a first variable stopper having a first rack and being configured to move along the swing guide;
a second variable stopper having a second rack and being configured to move along the first variable stopper; and
a power transmission mechanism configured to transmit a force to the first variable stopper and the second variable stopper, the power transmission mechanism including a first gear configured to mesh with the first rack and a second gear configured to mesh with the second rack;
wherein the first gear and the second gear form a unitary one-piece structure; and
wherein as the first variable stopper moves, the second variable stopper is configured to move with the first variable stopper in a same direction through the power transmission mechanism.

14. The apparatus according to claim 13, wherein a diameter of the first gear is greater than a diameter of the second gear.

15. The apparatus according to claim 13, wherein a length of the second rack is less than a length of the first rack.

16. The apparatus according to claim 13, wherein a gear ratio of the second gear and the first gear is defined as a speed increasing ratio.

17. A vehicle comprising:
a vehicle body including a door aperture;
a vehicle door coupled to the vehicle body and configured to cover and uncover the door aperture;
a rail mounted on the vehicle body;
a roller unit mounted on the vehicle door and configured to move along the rail to allow the vehicle door to open and close in a sliding mode and in a swing mode;
a sliding guide extending from a rear edge of the door aperture of the vehicle body and extending straightly in a longitudinal direction of the vehicle;
a swing guide bent from the sliding guide toward an interior of the vehicle;
a center roller unit mounted on the vehicle door and configured to be guided along the sliding guide and the swing guide; and
a variable stopper mechanism configured to cover an exterior-side opening of the swing guide in the sliding mode and to uncover the exterior-side opening of the swing guide in the swing mode.

18. The vehicle according to claim 17, wherein the sliding guide and the swing guide form a center rail.

19. The vehicle according to claim 17, wherein the variable stopper mechanism includes:
a first variable stopper configured to move along the swing guide, the first variable stopper including a touch wall;
a second variable stopper configured to move along the first variable stopper; and
a power transmission mechanism configured to transmit a force to the first variable stopper and the second variable stopper;
wherein rollers of the center roller unit are configured to come into contact with the touch wall of the first variable stopper; and
wherein as the first variable stopper moves, the second variable stopper is configured to move with the first variable stopper in a same direction through the power transmission mechanism.

20. The vehicle according to claim 19, wherein:
the first variable stopper has a first outboard sidewall and a first exterior-side opening aligned with the exterior-side opening of the swing guide; and
the second variable stopper has a second outboard sidewall and a second exterior-side opening aligned with the exterior-side opening of the swing guide and the first exterior-side opening.

* * * * *